(12) United States Patent
Kimura et al.

(10) Patent No.: US 10,081,385 B2
(45) Date of Patent: Sep. 25, 2018

(54) STEERING ASSIST DEVICE

(71) Applicant: TOYOTA JIDOSHA KABUSHIKI KAISHA, Toyota-shi, Aichi-ken (JP)

(72) Inventors: Yukihide Kimura, Gotemba (JP); Yoji Kunihiro, Susono (JP); Takeshi Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 15/376,094

(22) Filed: Dec. 12, 2016

(65) Prior Publication Data

US 2017/0183027 A1 Jun. 29, 2017

(30) Foreign Application Priority Data

Dec. 24, 2015 (JP) ................... 2015-251051

(51) Int. Cl.
*B62D 5/04* (2006.01)
*B62D 6/08* (2006.01)
*B62D 15/02* (2006.01)

(52) U.S. Cl.
CPC ......... *B62D 5/0463* (2013.01); *B62D 5/0466* (2013.01); *B62D 5/04* (2013.01); *B62D 5/0409* (2013.01); *B62D 5/0421* (2013.01); *B62D 5/0457* (2013.01); *B62D 5/0472* (2013.01); *B62D 5/0481* (2013.01);
(Continued)

(58) Field of Classification Search
CPC ...... B62D 5/0463; B62D 5/0466; B62D 6/08; B62D 5/0436; B62D 6/008; B62D 5/0472; B62D 6/002; B62D 15/025; B62D 5/0481; B62D 15/021; B62D 15/0235; B62D 5/047; B62D 6/10; B62D 15/0245; B62D 5/0484; B62D 5/049; B62D 5/0487; B62D 5/06; B62D 5/065; B62D 6/02; B62D 6/04; B62D 5/064; G01L 5/221; G01L 3/104
See application file for complete search history.

(56) References Cited

U.S. PATENT DOCUMENTS 5,767,642 A 6/1998 Furukawa
6,360,151 B1 3/2002 Suzuki et al.
(Continued)

FOREIGN PATENT DOCUMENTS

JP H09-58492 A 3/1997
JP 2001-114121 A 4/2001
(Continued)

*Primary Examiner* — Behrang Badii
(74) *Attorney, Agent, or Firm* — Oliff PLC

(57) ABSTRACT

A steering assist device includes: a steering torque detector; a steering operation amount acquisition device; an electric power steering device; and a control device configured to calculate a target control current of the electric power steering device, to supply the control current corresponding to the target control current to the electric power steering device, to determine a situation of steering operation of a driver, and to make a current component corresponding to the target inertia compensation assist torque in the target control current smaller when it is determined that the steering operation is turn-back steering with acceleration and deceleration than when it is determined that the steering operation of the driver is not the turn-back steering with acceleration and deceleration.

11 Claims, 14 Drawing Sheets

(52) U.S. Cl.
CPC .............. *B62D 5/0493* (2013.01); *B62D 6/08* (2013.01); *B62D 15/021* (2013.01); *B62D 15/025* (2013.01)

(56) References Cited

U.S. PATENT DOCUMENTS

| | | | |
|---|---|---|---|
| 6,370,459 B1* | 4/2002 | Phillips | B62D 5/0436 180/443 |
| 2005/0217923 A1* | 10/2005 | Onizuka | B62D 5/0409 180/444 |
| 2016/0001814 A1* | 1/2016 | Endo | B62D 5/0466 701/41 |
| 2016/0129935 A1* | 5/2016 | Akatsuka | B62D 5/0463 180/446 |

FOREIGN PATENT DOCUMENTS

| | | |
|---|---|---|
| JP | 2003-175846 A | 6/2003 |
| JP | 2004-291815 A | 10/2004 |
| JP | 2007-137272 A | 6/2007 |
| JP | 2012-171523 A | 9/2012 |
| WO | 2014/167631 A1 | 10/2014 |

\* cited by examiner

STEERING ASSIST DEVICE

INCORPORATION BY REFERENCE

The disclosure of Japanese Patent Application No. 2015-251051 filed on Dec. 24, 2015 including the specification, drawings and abstract is incorporated herein by reference in its entirety.

BACKGROUND

1. Field of the Disclosure

The present disclosure relates to a steering assist device that regulates steering assist torque to assist steering.

2. Description of Related Art

Vehicles, such as automobiles, generally incorporate a steering assist device that regulates steering assist torque generated by an electric power steering device to assist steering. The steering assist device of this kind is desirably configured not only to reduce a steering load of a driver but also to enhance steering feeling of the driver.

For example, as disclosed in Japanese Patent Application Publication No. 9-58492, it has been known to calculate a target steering assist torque so that the target steering assist torque includes not only a basic target steering assist torque based on a steering torque but also a target inertia compensation assist torque. The target inertia compensation assist torque is target assist torque for reducing influence of the force of inertia of the steering wheel on the force necessary for steering operation of the driver. The target inertia compensation assist torque is calculated based on a product of a moment of inertia of the steering wheel and steering angular acceleration.

SUMMARY

The steering assist device that performs inertia compensation based on the target inertia compensation assist torque can reduce a degree of the force of inertia of the steering wheel that hinders smooth steering operation of the driver. Consequently, even in the vehicles whose steering wheel has a large mass due to airbag devices and the like, the steering feeling of the driver can be enhanced as compared with the case where inertia compensation is not performed.

However, it has been revealed that execution of inertia compensation might deteriorate steering feeling in actuality, depending on a situation of steering operation, due to the torque based on the target inertia compensation assist torque, i.e., the inertia compensation assist torque, unnecessarily assisting the steering operation of the driver. That is, in the situation where turn-back is performed with acceleration and deceleration, i.e., in the situation where the steering wheel is operated toward a neutral position at increasing or decreasing steering speed, the inertia compensation assist torque acts in a direction of promoting turn-back steering.

Accordingly, even in the case where, for example, the driver is going to end steering at a position in the middle of turn-back or at the neutral position, the inertia compensation assist torque acts as inertia torque that operates to continue the steering action, which may cause steering overshoot and increase the steering force necessary for ending the steering operation at the neutral position and the like. Therefore, as compared with the case where inertia compensation is not performed, the steering feeling is deteriorated at the time of turn-back performed with acceleration and deceleration, and the deterioration of the steering feeling becomes more notable as steering angular speed and the steering angular acceleration are larger.

Even when the steering operation of the driver is turn-back, the steering angular acceleration is zero if the steering speed is constant. As a result, the target inertia compensation assist torque calculated based on the product of the moment of inertia of the steering wheel and the steering angular acceleration also becomes zero. In this case, the problem attributed to the inertia compensation assist torque acting as inertia torque does not arise.

The present disclosure provides a steering assist device that performs inertia compensation with inertia compensation assist torque to enhance steering feeling of the driver in the situation where turn-back is performed with acceleration and deceleration.

An aspect of the present disclosure is a steering assist device, including: a steering torque detector configured to detect steering torque; a steering operation amount acquisition device configured to acquire information on steering angular speed and steering angular acceleration; an electric power steering device configured to generate steering assist torque corresponding to a control current; and a control device configured i) to calculate a target control current of the electric power steering device based on a target steering assist torque, ii) to supply the control current corresponding to the target control current to the electric power steering device, the target steering assist torque including a basic target steering assist torque based on the steering torque and a target inertia compensation assist torque based on a product of a moment of inertia of a steering wheel and the steering angular acceleration, iii) to determine a situation of steering operation of a driver based on the steering angular speed and the steering angular acceleration, and iv) to make a current component corresponding to the target inertia compensation assist torque in the target control current smaller when it is determined that the steering operation is turn-back steering with acceleration and deceleration than when it is determined that the steering operation of the driver is not the turn-back steering with acceleration and deceleration.

A steering operation amount acquisition device acquires information on steering angular speed, the control device determines a situation of steering operation of a driver based on the steering angular speed and steering angular acceleration, and makes, when it is determined that the steering operation of the driver is turn-back steering with acceleration and deceleration, the magnitude of a current component corresponding to target inertia compensation assist torque in a target control current smaller as compared with when it is determined that the steering operation of the driver is not the turn-back steering with acceleration and deceleration.

As described later in detail, it becomes possible to determine, based on the steering angular speed and the steering angular acceleration, whether or not the steering operation of the driver is the turn-back steering with acceleration and deceleration. According to the configuration, when it is determined that the steering operation of the driver is the turn-back steering with acceleration and deceleration, the magnitude of the current component corresponding to the target inertia compensation assist torque in the target control current is made smaller as compared with when it is determined that the steering operation of the driver is not the turn-back steering with acceleration and deceleration.

Consequently, in the situation where turn-back is performed with acceleration and deceleration, decreasing the magnitude of the inertia compensation assist torque makes it possible to decrease the magnitude of the inertia torque that operates to continue the turn-back steering beyond a position at which the driver intends to terminate the turn-back steering. Therefore, since the degree of the inertia compensation assist torque obstructing termination of the turn-back steering of the driver can be reduced, the steering feeling in the situation where turn-back is performed with acceleration and deceleration can be enhanced as compared with before.

The target control current is calculated based on the target steering assist torque including the basic target steering assist torque and the target inertia compensation assist torque. Therefore, it may be considered that the target control current contains a current component corresponding to the basic target steering assist torque and a current component corresponding to the target inertia compensation assist torque. Therefore, in the present disclosure, the magnitude of the latter current component is made smaller.

In the above aspect, the control device may be configured to make the current component corresponding to the target inertia compensation assist torque smaller as a magnitude of the steering angular speed is larger.

According to the above aspect, the magnitude of the current component corresponding to the target inertia compensation assist torque is made smaller as the magnitude of the steering angular speed is larger. Therefore, the magnitude of the current component corresponding to the target inertia compensation assist torque can be made smaller as the magnitude of the steering angular speed is larger, i.e., as deterioration in steering feeling is more likely to be notable, the deterioration being attributed to the inertia compensation assist torque obstructing termination of the turn-back steering of the driver.

Therefore, in the situation where the magnitude of the steering angular speed is small, unnecessary decrease in the magnitude of the inertia compensation assist torque can be avoided, while a reduction amount in the magnitude of the inertia compensation assist torque and a reduction amount in the inertia torque can be increased as the magnitude of the steering angular speed is larger.

In the above aspect, the control device may be configured to correct the target inertia compensation assist torque so that the target inertia compensation assist torque becomes smaller when it is determined that the steering operation is the turn-back steering with acceleration and deceleration than when it is determined that the steering operation is not the turn-back steering with acceleration and deceleration, and to calculate the target control current based on the target steering assist torque including the basic target steering assist torque and a corrected target inertia compensation assist torque.

According to the above aspect, when it is determined that the steering operation of the driver is turn-back steering with acceleration and deceleration, the target inertia compensation assist torque is corrected so that the magnitude of the target inertia compensation assist torque becomes smaller as compared with when it is determined that the steering operation of the driver is not the turn-back steering with acceleration and deceleration. Furthermore, the target control current is calculated based on the target steering assist torque including the basic target steering assist torque and the corrected target inertia compensation assist torque.

Therefore, in the situation where turn-back is performed with acceleration and deceleration, decreasing the magnitude of the target inertia compensation assist torque makes it possible to decrease the magnitude of the current component corresponding to the target inertia compensation assist torque. Therefore, it becomes possible to decrease the magnitude of the inertia compensation assist torque that acts as inertia torque at the time of turn-back with acceleration and deceleration.

In the above aspect, the control device may be configured to correct the target inertia compensation assist torque so that the target inertia compensation assist torque becomes smaller as the steering angular speed is larger.

According to the above aspect, the target inertia compensation assist torque is corrected so that the magnitude of the target inertia compensation assist torque becomes smaller as the magnitude of the steering angular speed is larger. Therefore, the magnitude of the target inertia compensation assist torque can be made smaller as the magnitude of the steering angular speed is larger, i.e., as deterioration in steering feeling is more likely to be notable, the deterioration being attributed to the inertia compensation assist torque acting as inertia torque. Therefore, in the situation where the magnitude of the steering angular speed is small, unnecessary decrease in the magnitude of the target inertia compensation assist torque can be avoided, while the magnitude of the inertia compensation assist torque can effectively be decreased in the situation where the magnitude of the steering angular speed is large.

In the above aspect, the control device may be configured to calculate the target control current as a value containing a first target control current based on the basic target steering assist torque and a second target control current based on the target inertia compensation assist torque and the control device may be configured to calculate the target control current after correcting the second target control current so that the second target control current becomes smaller when it is determined that the steering operation of the driver is the turn-back steering with acceleration and deceleration than when it is determined that the steering operation is not the turn-back steering with acceleration and deceleration.

According to the above aspect, when it is determined that the steering operation of the driver is the turn-back steering with acceleration and deceleration, the magnitude of the second target control current based on the target inertia compensation assist torque is made smaller as compared with when it is determined that the steering operation of the driver is not the turn-back steering with acceleration and deceleration. Furthermore, the target control current is calculated as a value containing the first target control current and a corrected second target control current.

Therefore, in the situation where turn-back is performed with acceleration and deceleration, it becomes possible to decrease the magnitude of the second target control current based on the target inertia compensation assist torque, i.e., the magnitude of the current component corresponding to the target inertia compensation assist torque. Therefore, it becomes possible to decrease the magnitude of the torque based on the target inertia compensation assist torque that acts as inertia torque at the time of turn-back with acceleration and deceleration.

In the above aspect, the control device may be configured to correct the second target control current so that the second target control current becomes smaller as the steering angular speed is larger.

According to the above aspect, the second target control current is corrected so that the magnitude of the second target control current becomes smaller as the magnitude of the steering angular speed is larger. Therefore, the magnitude of the second target control current can be made smaller as the magnitude of the steering angular speed is larger, i.e. as deterioration in steering feeling is more likely to be notable, the deterioration being attributed to the torque based on the target inertia compensation assist torque acting as inertia torque. Therefore, in the situation where the magnitude of the steering angular speed is small, unnecessary decrease in the magnitude of the second target control current can be avoided, while the magnitude of the second target control current can effectively be decreased in the situation where the magnitude of the steering angular speed is large.

In the above aspect, the control device may be configured to correct the target steering assist torque so that the target steering assist torque becomes smaller when it is determined that the steering operation is the turn-back steering with acceleration and deceleration than when it is determined that the steering operation is not the turn-back steering with acceleration and deceleration, and to calculate the target control current based on the target steering assist torque corrected.

At the time of turn-back steering, steering operation of the driver is promoted by self-aligning torque, so that the steering torque has a value of zero or any small negative value. Consequently, even when the magnitude of the basic target steering assist torque based on the steering torque is decreased, the driver does not feel excessive increase in a load of steering. Therefore, when the steering operation of the driver is the turn-back steering with acceleration and deceleration, the magnitude of the target inertia compensation assist torque may be decreased by decreasing the magnitude of the target steering assist torque.

According to the above aspect, when it is determined that the steering operation of the driver is the turn-back steering with acceleration and deceleration, the target steering assist torque is corrected so that the magnitude of the target steering assist torque is made small, and the control current is calculated based on a corrected target steering assist torque.

Therefore, in the situation where turn-back is performed with acceleration and deceleration, decreasing the magnitude of the target inertia compensation assist torque together with the magnitude of the basic target steering assist torque makes it possible to decrease the magnitude of the current component corresponding to the target inertia compensation assist torque. Therefore, it becomes possible to decrease the magnitude of the torque based on the target inertia compensation assist torque that acts as inertia torque at the time of turn-back with acceleration and deceleration.

In the above aspect, the control device may be configured to correct the target steering assist torque so that the target steering assist torque becomes smaller as the steering angular speed is larger.

According to the above aspect, the target steering assist torque is corrected so that the magnitude of the target steering assist torque becomes smaller as the magnitude of the steering angular speed is larger. Therefore, as the magnitude of the steering angular speed is larger, the magnitude of the target inertia compensation assist torque as well as the magnitude of the basic target steering assist torque are made smaller. As a result, it becomes possible to make the magnitude of the current component corresponding to the target inertia compensation assist torque smaller as the magnitude of the steering angular speed is larger.

In the above aspect, the control device may be configured to correct the target control current so that the target control current becomes smaller when it is determined that the steering operation is the turn-back steering with acceleration and deceleration than when it is not determined that the steering operation is the turn-back steering with acceleration and deceleration and to supply the control current corresponding to the target control current corrected to the electric power steering device.

As described before, even if the magnitude of the basic target steering assist torque based on the steering torque is decreased at the time of turn-back steering, the driver does not feel excessive increase in the load of steering. Therefore, when the steering operation of the driver is the turn-back steering with acceleration and deceleration, the magnitude of the current component corresponding to the target inertia compensation assist torque may be decreased by decreasing the magnitude of the target control current calculated based on the target steering assist torque.

According to the above aspect, when it is determined that the steering operation of the driver is the turn-back steering with acceleration and deceleration, the target control current is corrected so that the magnitude of the target control current becomes small, and the electric power steering device is controlled with a corrected target control current. Therefore, since the magnitude of the current component corresponding to the target inertia compensation assist torque is decreased, it becomes possible to decrease the magnitude of the torque based on the target inertia compensation assist torque that acts as inertia torque at the time of turn-back with acceleration and deceleration.

In the above aspect, the control device may be configured to correct the target control current so that the target control current becomes smaller as the steering angular speed is larger.

According to the above aspect, the target steering assist torque is corrected so that the magnitude of the target control current becomes smaller as the magnitude of the steering angular speed is larger. Therefore, it becomes possible to make the magnitude of the current component corresponding to the basic target steering assist torque as well as the magnitude of the current component corresponding to the target inertia compensation assist torque smaller as the magnitude of the steering angular speed is larger.

In the above aspect, the control device may be configured to make a gain for feedback control smaller as an absolute value of the product of the steering angular speed and the steering angular acceleration is larger so that the control current of the electric power steering device coincides with the target control current, when it is determined that the steering operation is a turn-increase steering with acceleration and deceleration.

In the situation where turn-increase steering is performed with acceleration and deceleration, i.e., in the situation where the steering wheel is operated in a direction away from a neutral position at increasing or decreasing steering speed, the inertia compensation assist torque acts in a direction of promoting the turn-increase steering. Therefore, as compared with the case where the inertia compensation assist torque is not included in the target steering assist torque, the driver can smoothly perform the turn-increase steering.

In the situation where the turn-increase steering is performed with acceleration and deceleration when the inertia compensation assist torque is low, the driver is likely to feel that the turn-increase steering is not sufficiently smooth. On the contrary, when the inertia compensation assist torque is high, the driver feels that the turn-increase steering is sufficiently smooth even with a rough steering operation. However, with a mild steering operation, the torque in the direction of promoting the turn-increase steering due to the inertia compensation assist torque becomes excessive. Therefore, the driver may find it difficult to perform stable steering due to insufficient steering resistance.

According to the above aspect, when it is determined that the steering operation of the driver is a turn-increase steering with acceleration and deceleration, a gain for feedback control is made larger as an absolute value of the product of the steering angular speed and the steering angular acceleration is larger, so that the control current of the electric power steering device coincides with the target control current. As described later in detail, the absolute value of the product of the steering angular speed and the steering angular acceleration is an index value representing roughness of the steering operation of the driver. Therefore, it becomes possible to prevent responsiveness in the control of steering assist torque from becoming excessive in the situation where the steering operation of the driver is mild. In the situation where the steering operation of the driver is rough, the control current of the electric power steering device can be controlled to coincide with the target control current with sufficient responsiveness. Therefore, the possibilities of the driver feeling insufficient smoothness in the turn-increase steering can be reduced, and the influence of disturbance on the steering feeling can be reduced, the disturbance being input from a road surface into the steering wheel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the embodiments of the present disclosure will be described in detail with reference to the accompanying drawings.

Figure 1:
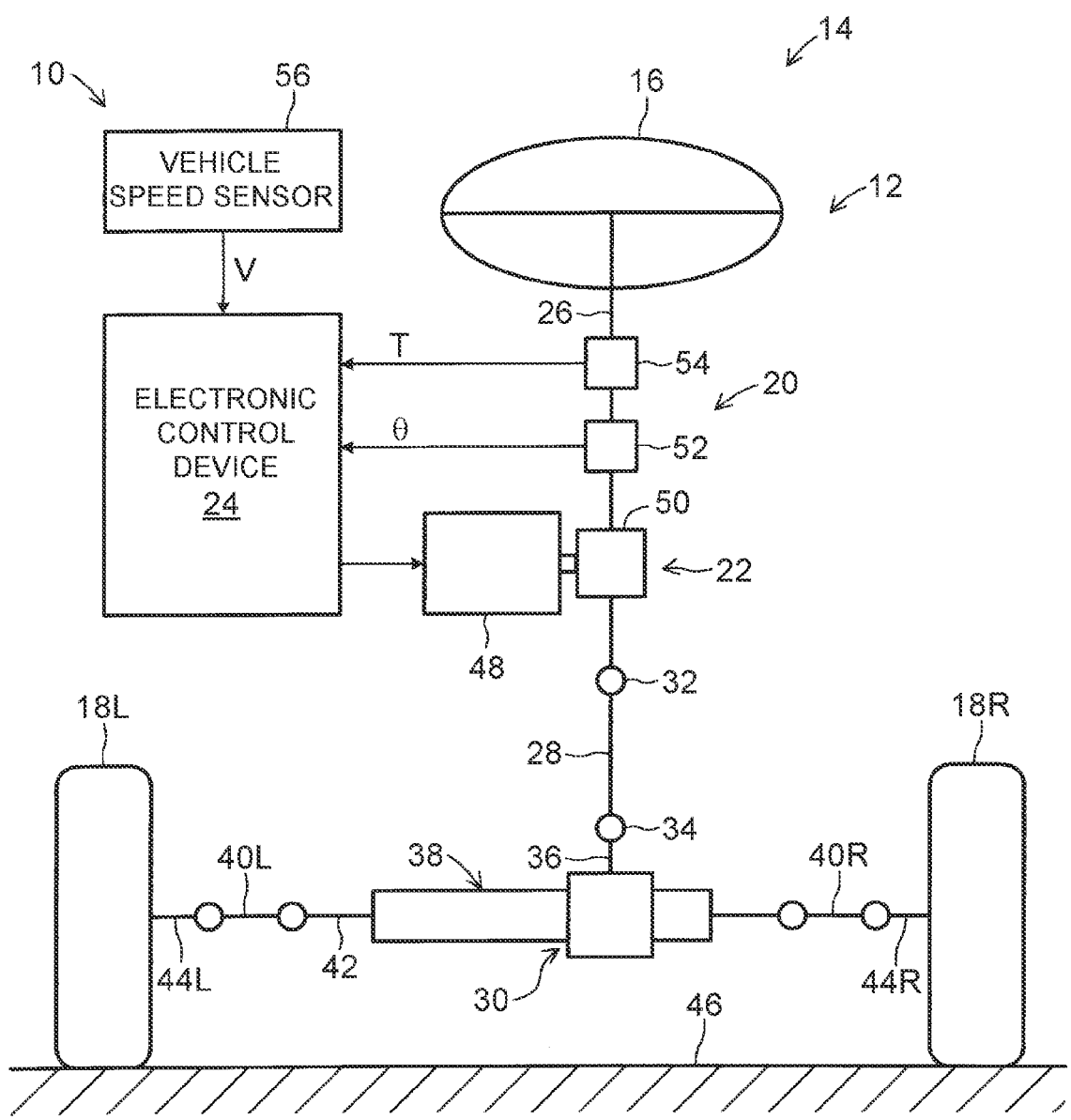
FIG. 1 is a schematic view illustrating a steering assist device for a vehicle according to a first embodiment of the present disclosure.

A description is given of the first embodiment. FIG. 1 is a schematic explanatory view illustrating a steering assist device 10 for a vehicle according to the first embodiment of the present disclosure. The steering assist device 10 is applied to a vehicle 14 equipped with a steering gear 12. The steering gear 12 includes a steering wheel 16 operated by a driver, front wheels 18L, 18R used as steering wheels, and a transmission device 20 that transmits force and displacement relating to steering between the steering wheel 16 and the front wheels 18L, 18R. The steering assist device 10 has an electric power steering device 22 that generates steering assist torque Ta and applies the steering assist torque Ta to the transmission device 20, and an electronic control device 24 that controls the electric power steering device 22.

In the illustrated embodiment, the electric power steering device 22 is a column-assist type electric power steering device (EPS). The electric power steering device may be an electric power steering device of other types, such as a rack-coaxial and rack-assist type electric power steering device, as long as the device can control the steering assist torque Ta.

As illustrated in FIG. 1, the transmission device 20 includes an upper steering shaft 26 rotating in unison with the steering wheel 16, an intermediate shaft 28, and a steering mechanism 30. The intermediate shaft 28 is coupled at its upper end to a lower end of the upper steering shaft 26 through a universal joint 32, and is coupled at its lower end to a pinion shaft 36 of the steering mechanism 30 through a universal joint 34.

The steering mechanism 30 includes a rack-and-pinion type steering unit 38 and tie rods 40L, 40R. The steering unit 38 converts rotation of the pinion shaft 36 into a linear motion of a rack bar 42, and vice versa, the linear motion being in a lateral direction of the vehicle. The tie rods 40L, 40R are pivotally attached at their inner ends to inner ends of the rack bar 42. The tie rods 40L, 40R are pivotally attached at their outer ends to knuckle arms 44L, 44R that are provided in carriers (not illustrated) of the right and left front wheels 18L, 18R.

Accordingly, rotational displacement and rotation torque of the steering wheel 16 are converted into pivoting and rotation torque around kingpin shafts (not illustrated) of the front wheels 18L, 18R and are transmitted to the front wheels 18L, 18R by the transmission device 20. The transmission device 20 transmits the pivoting and the rotation torque around the kingpin shafts, which are given from a road surface 46 to the right and left front wheels 18L, 18R, to the steering wheel 16 as the rotational displacement and the rotation torque, respectively.

The electric power steering device 22 has an electric motor 48 and a converter 50. The converter 50 includes a worm gear fixed to the rotating shaft of the electric motor 48 and a worm wheel fixed to the upper steering shaft 26, which are not illustrated in FIG. 1. The converter 50 converts rotation torque of the electric motor 48 into rotation torque around the upper steering shaft 26 and transmits the rotation torque to the upper steering shaft.

The electronic control device 24 functions as a control device that controls the rotation torque of the electric motor 48 so as to control steering assist torque Ta applied to the upper steering shaft 26 by the electric power steering device 22 as described later in detail. The electronic control device 24 receives signals indicative of steering angle θ and steering torque T from a steering angle sensor 52 and a torque sensor 54 provided in the upper steering shaft 26, respectively. The electronic control device 24 also receives a signal indicative of vehicle speed V from the vehicle speed sensor 56.

The electronic control device 24 includes a microcomputer having a central processing unit (CPU), a read only memory (ROM), a random access memory (RAM), and an input-output port device, which are connected to each other through a bidirectional common bus. The ROM may store data such as a control program and maps described later. The steering angle sensor 52 and the torque sensor 54 detect the steering angle θ and the steering torque T, each having a value of zero when the vehicle travels straight and having positive values when the vehicle is steered in the left-turn direction. Calculation values, such as the target basic steering assist torque Tab described later, are also positive in the left-turn direction.

As described later, the electronic control device 24 calculates the target steering assist torque Tat and controls the rotation torque of the electric motor 48 in accordance with the flowchart illustrated in FIG. 2 so as to execute control to make an actual steering assist torque Ta coincide with the target steering assist torque Tat. The target steering assist torque Tat is a sum of the target basic steering assist torque Tab for lessening a steering load of the driver and a target inertia compensation assist torque Tai for reducing the influence of inertia of the steering wheel 16. The electronic control device 24 calculates, based on the target steering assist torque Tat, the target control current It that is used to control the electric power steering device 22 for making the steering assist torque Ta coincide with the target steering assist torque Tat.

The electronic control device 24 also calculates steering angular speed dθ as a time differential value of the steering angle θ, and calculates steering angular acceleration ddθ as a time differential value of the steering angular speed θd, i.e., as a second-time differential value of the steering angle θ. The electronic control device 24 further determines the situation of the steering operation of the drive based on the steering angular speed dθ and the steering angular acceleration ddθ so as to determine whether or not the steering operation is turn-back with acceleration and deceleration in particular.

Figure 21:
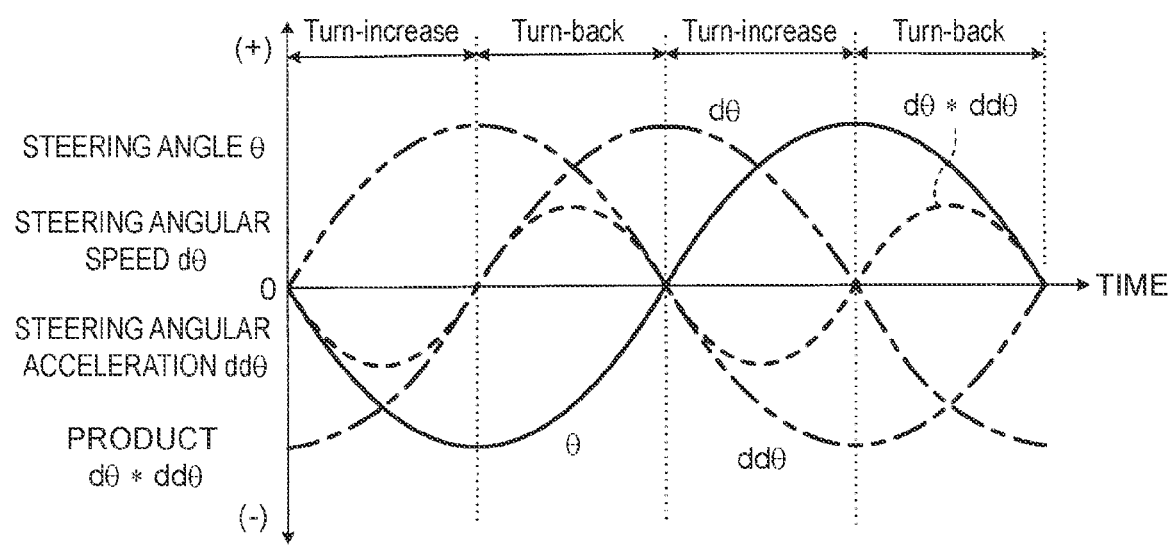
FIG. 21 illustrates changes in the steering angle $\theta$, the steering angular speed $d\theta$, the steering angular acceleration $dd\theta$, and the product $d\theta*dd\theta$ in the case where steering operation is performed, the steering operation including a turn-increase in a right-turn direction of the vehicle followed by a turn-back, and a turn-increase in a left-turn direction of the vehicle followed by another turn-back.

FIG. 21 illustrates changes in the steering angle θ, the steering angular speed dθ, the steering angular acceleration ddθ, and the product dθ*ddθ in the case where steering operation is performed, the steering operation including a turn-increase in the right-turn direction of the vehicle followed by a turn-back, and a turn-increase in the left-turn direction of the vehicle followed by another turn-back. Table 1 indicates signs of the steering angle θ, the steering angular speed dθ, the steering angular acceleration ddθ, and the product dθ*ddθ in the case where the steering operation is performed. Parameters such as the steering angle θ have a positive sign when the steering operation is in the left-turn direction. The operation "turn-increase" is the steering in which the absolute value of the steering angle θ increases, whereas the operation "turn-back" is steering in which the absolute value of the steering angle θ decreases.

TABLE 1

| Situation of steering operation | Turn-increase in right-turn direction | Turn-back to zero | Turn-increase in left-turn direction | Turn-back to zero |
|---|---|---|---|---|
| Steering angle θ | − | − | + | + |
| Steering angular speed dθ | − | + | + | − |
| Steering angular acceleration ddθ | + | + | − | − |
| Product dθ * ddθ | − | + | − | + |

As indicated in Table 1, the product dθ*ddθ has a negative sign when the steering operation is turn-increase and has a positive sign when the steering operation is turn-back regardless of the sign of the steering angle θ. When the steering operation is steering at constant speed, both the steering angular speed dθ and the steering angular acceleration ddθ become zero, and therefore the product dθ*ddθ also becomes zero. On the contrary, when the steering operation is steering with acceleration and deceleration, the steering angular speed dθ and the steering angular acceleration ddθ do not become zero, and therefore the product dθ*ddθ also becomes a positive or negative value.

Therefore, the electronic control device 24 determines that the steering operation of the driver is turn-back steering with acceleration and deceleration, when the steering angular speed dθ and the steering angular acceleration ddθ have an identical sign, i.e., when the product dθ*ddθ has a positive sign. The rule also applies to the second to eighth embodiments described later.

The torque based on the target inertia compensation assist torque Tai acts in a direction opposite to the steering direction when the steering angular acceleration ddθ has the same sign as that of the steering angular speed dθ. Accordingly, Table 1 indicates that the torque acts in the direction opposite to the steering direction when the steering operation of the driver is turn-back steering with acceleration and deceleration. Therefore, when the steering operation is the turn-back steering with acceleration and deceleration, it is preferable that the magnitude of the target inertia compensation assist torque Tai is corrected to be decreased so that the magnitude of a current component corresponding to the target inertia compensation assist torque Tai in the target control current It becomes small.

In the first embodiment in particular, when it is determined that the steering operation of the driver is turn-back with acceleration and deceleration, the electronic control device 24 multiplies the target steering assist torque Tat by a correction coefficient K1, which is smaller than one, to calculate a corrected target steering assist torque Tat with its magnitude being reduced. The electronic control device 24 further calculates the target control current It based on the corrected target steering assist torque Tat.

The electronic control device 24 further performs feedback control of the control current supplied to the electric motor 48 based on the target control current It to control the steering assist torque so that the steering assist torque Ta coincides with the target steering assist torque Tat.

Figure 2:
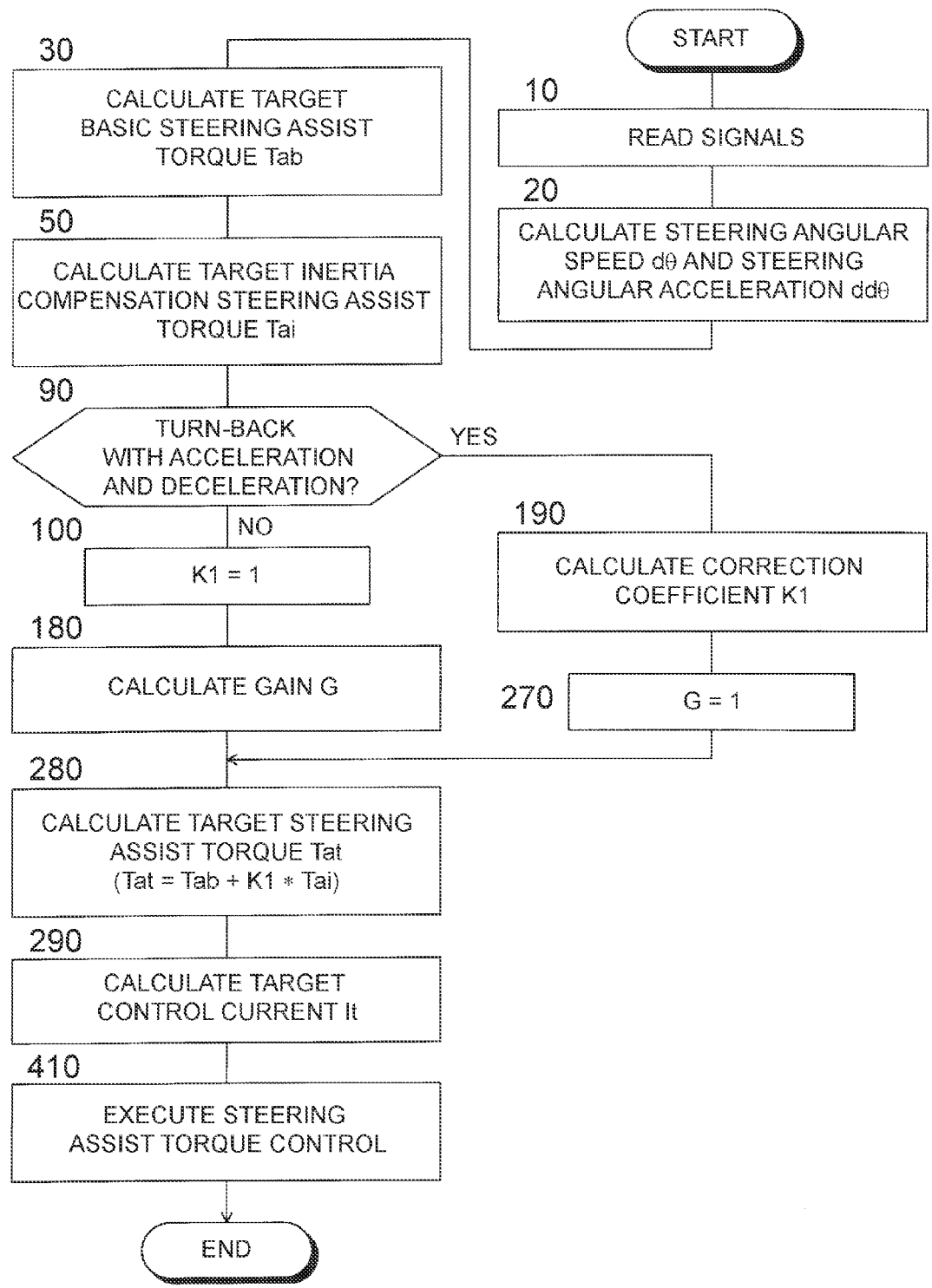
FIG. 2 is a flowchart illustrating a steering assist torque control routine in the first embodiment.

A description is now given of a steering assist torque control routine executed by the electronic control device 24 with reference to the flowchart illustrated in FIG. 2. The control based on the flowchart illustrated in FIG. 2 is repeatedly executed for every specified time, when an ignition switch, which is not illustrated, is turned on. In the following description, the steering assist torque control based on the flowchart illustrated in FIG. 2 is simply referred to as "control." The rules also apply to the steering assist torque control in other embodiments described later.

First, in step 10, signals such as a signal indicative of the steering angle θ detected by the steering angle sensor 52 and a signal indicative of the steering torque T detected by the torque sensor 54 are read.

In step 20, the steering angular speed dθ is calculated as a time differential value of the steering angle θ, and the steering angular acceleration ddθ as a time differential value of the steering angular speed θd, i.e., as a second-time differential value of the steering angle θ. Therefore, the electronic control device 24 that executes step 20 functions as a steering operation amount acquisition device that acquires the information on the steering angle θ, the steering angular speed dθ, and the steering angular acceleration ddθ in cooperation with the steering angle sensor 52.

Figure 10:
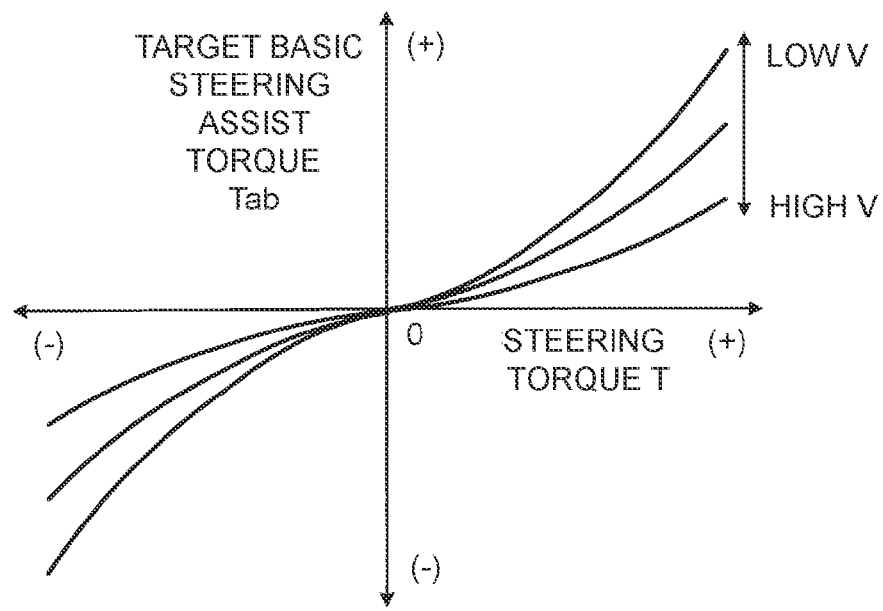
FIG. 10 is a map for calculation of target basic steering assist torque Tab based on steering torque T and vehicle speed V.

In step 30, the target basic steering assist torque Tab is calculated from a map illustrated in FIG. 10 based on the steering torque T and the vehicle speed V. As illustrated in FIG. 10, the target basic steering assist torque Tab is calculated so that the magnitude of the target basic steering assist torque Tab becomes larger as the magnitude of the steering torque T is larger and the magnitude of the target basic steering assist torque Tab becomes smaller as the vehicle speed V is higher.

Figure 11:
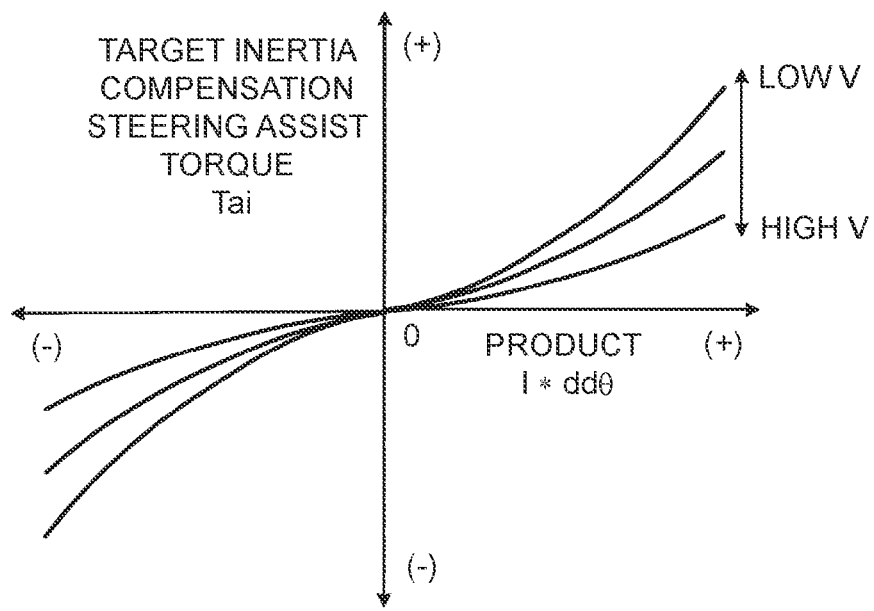
FIG. 11 is a map for calculation of target inertia compensation steering assist torque Tai based on a product $I*dd\theta$ of a moment of inertia I of the steering wheel and steering angular acceleration $dd\theta$ and on the vehicle speed V.

In step 50, the target inertia compensation steering assist torque Tai is calculated from the map illustrated in FIG. 11 based on a product I*ddθ of a moment of inertia I of the steering wheel 16 and the steering angular acceleration ddθ, and on the vehicle speed V. The target inertia compensation steering assist torque Tai is calculated so that the magnitude of the target inertia compensation steering assist torque Tai becomes larger as the magnitude of the product I*ddθ is larger and the magnitude of the target inertia compensation steering assist torque Tai becomes smaller as the vehicle speed V is higher.

In step 90 executed subsequent to step 50, it is determined whether or not the steering operation of the driver is turn-back with acceleration and deceleration. When the result of determination is positive, control proceeds to step 190, whereas when the result of determination is negative, the correction coefficient K1 for reducing the magnitude of the target inertia compensation steering assist torque Tai is set to one in step 100. When step 100 is completed, control proceeds to step 180.

In step 180, a gain G for later-described control current feedback control is calculated from the map illustrated in FIG. 12 based on an absolute value of a product I*dθ*ddθ of the moment of inertia I of the steering wheel 16, the steering angular speed dθ, and the steering angular acceleration ddθ. The gain G is calculated to be one when the product I*dθ*ddθ is zero and to become larger in the range of larger than one as the absolute value of the product I*dθ*ddθ is larger.

The absolute value of the product I*dθ*ddθ used for the calculation of the gain G is an index value indicating roughness of the steering operation of the driver. Since the moment of inertia I of the steering wheel 16 may be regarded to be constant, the gain G may be calculated based on the absolute value of the product dθ*ddθ of the steering angular speed dθ and the steering angular acceleration ddθ.

Figure 13:
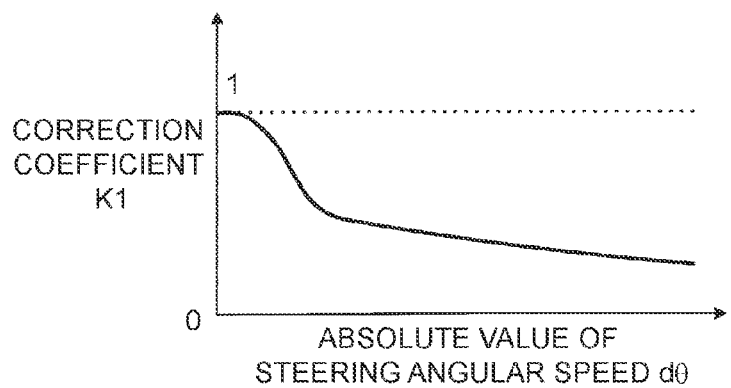
FIG. 13 is a map used to calculate a correction coefficient K1 for reducing the magnitude of the target inertia compensation assist torque Tai based on an absolute value of the steering angular speed $d\theta$.

In step 190, the correction coefficient K1 is calculated from the map illustrated in FIG. 13 based on the absolute value of the steering angular speed dθ. The correction coefficient K1 is calculated to be one when the absolute value of the steering angular speed dθ is a minute value and to become smaller in the range of less than one and larger than zero as the absolute value of the steering angular speed dθ is larger.

In step 270 executed subsequent to step 190, the gain G of the feedback control of the control current supplied to the electric motor 48 of the electric power steering device 22 is set to one. When the processing of step 180 or step 270 is completed, control proceeds to step 280.

In step 280, the target steering assist torque Tat is calculated as a sum of the target basic steering assist torque Tab and a product K1*Tai of the correction coefficient K1 and the target inertia compensation steering assist torque Tai according to a following expression (1). The product K1*Tai is a corrected target inertia compensation steering assist torque with its magnitude corrected with the correction coefficient K1.

$$Tat = Tab + K1*Tai \quad (1)$$

In step 290, the target control current It to control the electric power steering device 22 for making the steering assist torque Ta coincide with the target steering assist torque Tat is calculated based on the target steering assist torque Tat.

In step 410 executed subsequent to step 290, feedback control of the electric power steering device 22 is performed based on the target control current It so that the steering assist torque Ta coincides with the target steering assist torque Tat. That is, according to a following expression (2), a feedback control amount Ita of the control current is calculated as a difference between the target control current It and an actual control current Ifb supplied to the electric motor 48 of the electric power steering device 22. Furthermore, when the control current supplied to the electric motor 48 is controlled based on the feedback control amount Ita, steering assist torque control is executed.

$$Ita = G(It - Ifb) \quad (2)$$

As is clear from the above description, in step 30, the target basic steering assist torque Tab is calculated, and in step 50, the target inertia compensation steering assist torque Tai is calculated based on the product $I*dd\theta$ of the moment of inertia I of the steering wheel 16 and the steering angular acceleration $dd\theta$, and on the vehicle speed V.

When it is determined in step 90 that the steering operation of the driver is turn-back with acceleration and deceleration, the positive correction coefficient K1 smaller than one is calculated based on the absolute value of the steering angular speed $d\theta$ in step 190, the correction coefficient K1 being smaller as the absolute value of the steering angular speed $d\theta$ is larger. In step 280, the target steering assist torque Tat is calculated as a sum of the target basic steering assist torque Tab and the product K1*Tai of the correction coefficient K1 and the target inertia compensation steering assist torque Tai. Furthermore, in steps 290 and 410, the electric power steering device 22 is controlled so that the steering assist torque Ta coincides with the target steering assist torque Tat.

According to the first embodiment, when it is determined that the steering operation of the driver is turn-back with acceleration and deceleration, the magnitude of the target inertia compensation steering assist torque Tai is corrected to be smaller with the correction coefficient K1, and the target steering assist torque Tat is calculated based on the corrected target inertia compensation steering assist torque. Consequently, in the situation where turn-back is performed with acceleration and deceleration, decreasing the magnitude of the inertia compensation assist torque makes it possible to decrease the magnitude of the inertia torque that operates to continue turn-back steering beyond a position at which the driver intends to terminate the turn-back steering. Therefore, since the degree of the inertia compensation assist torque obstructing termination of the turn-back steering of the driver can be reduced, the steering feeling in the situation where turn-back is performed with acceleration and deceleration can be enhanced as compared with before.

Figure 3:
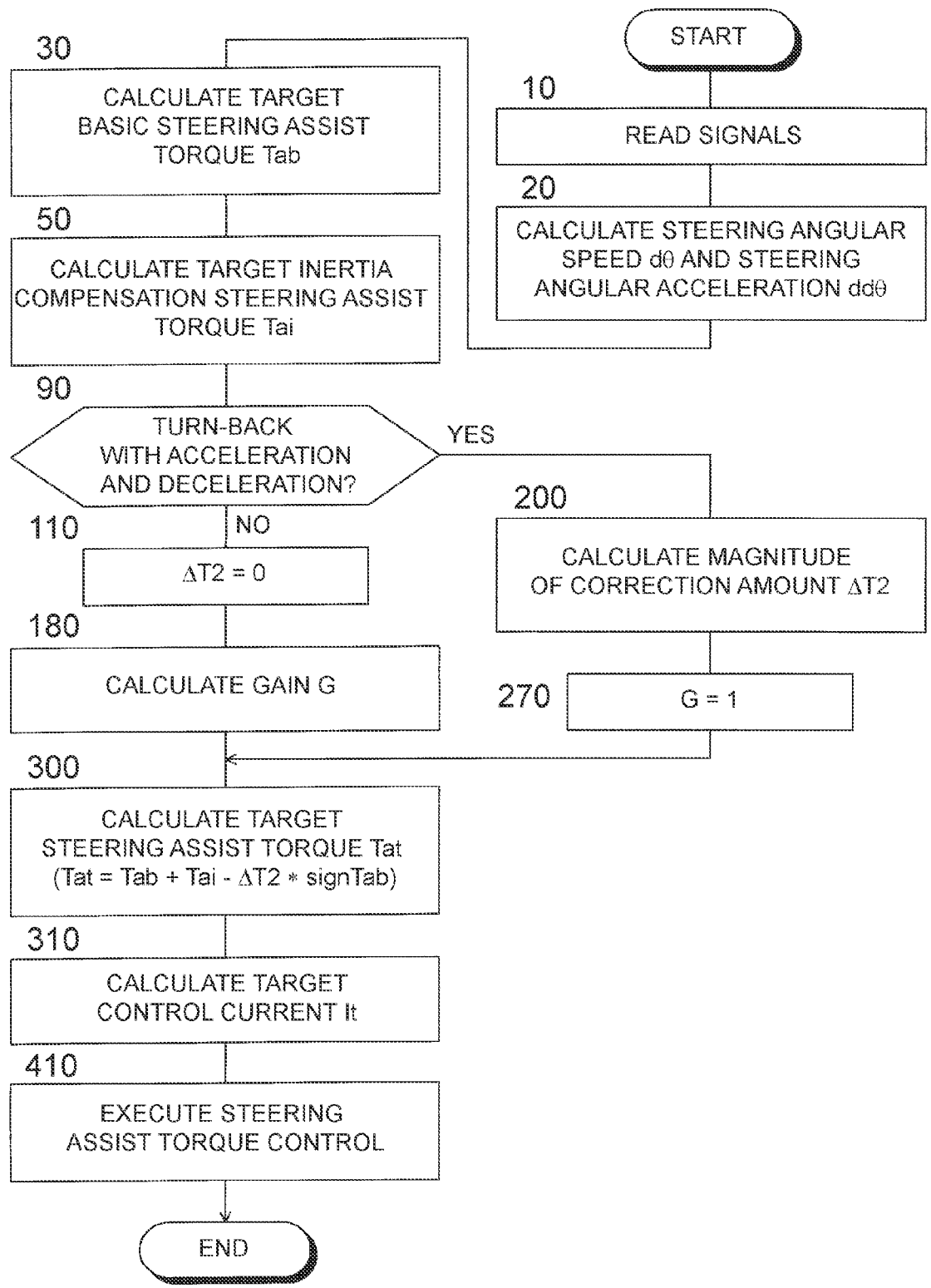
FIG. 3 is a flowchart illustrating the steering assist torque control routine in a second embodiment.
Figure 7:
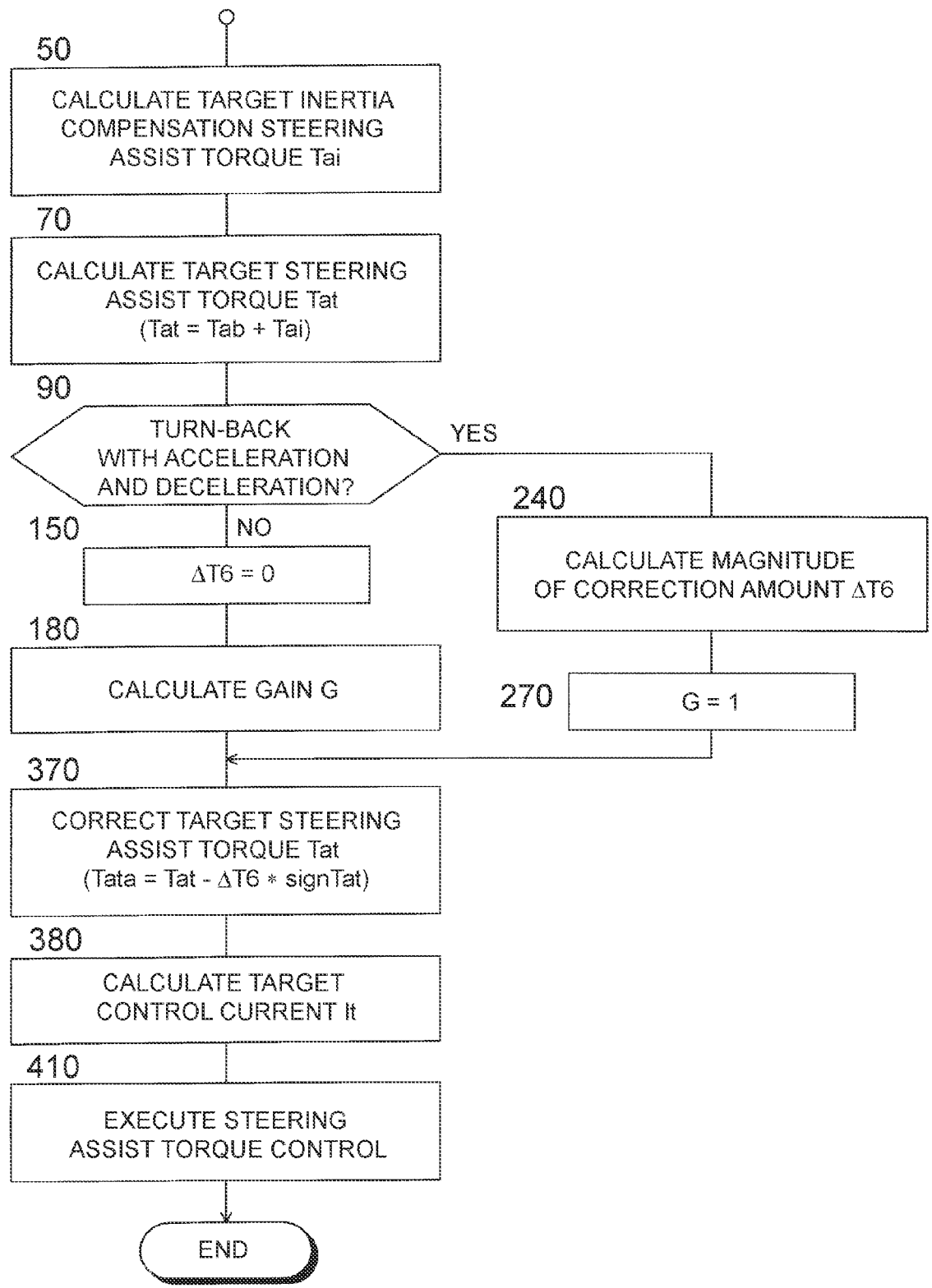
FIG. 7 is a flowchart illustrating the steering assist torque control routine in a sixth embodiment with part of the routine being omitted.

A description is given of the second embodiment. FIG. 3 is a flowchart illustrating the steering assist torque control routine in the second embodiment. In FIG. 7, the steps same as the steps illustrated in FIG. 2 are designated by the step numbers same as the step numbers assigned in FIG. 2. The rule also applies to other embodiments described later.

Figure 14:
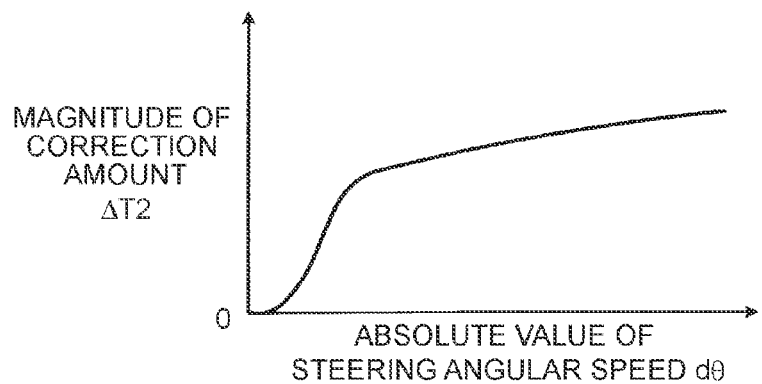
FIG. 14 is a map used to calculate the magnitude of a correction amount $\Delta T2$ for reducing the magnitude of the target inertia compensation assist torque Tai based on the absolute value of the steering angular speed $d\theta$ in the second embodiment.

As is clear from comparison between FIG. 3 and FIG. 2, steps 10 to 90, 180, 270, 410 are executed in the second embodiment in the same manner as in the first embodiment. When the result of determination is negative in step 90, the magnitude of a correction amount $\Delta T2$ for reducing the magnitude of the target inertia compensation assist torque Tai is set to zero in step 110. On the contrary, when the result of determination is positive in step 90, the magnitude of the correction amount $\Delta T2$ is calculated from the map illustrated in FIG. 14 based on the absolute value of the steering angular speed $d\theta$ in step 200.

The magnitude of the correction amount $\Delta T2$ is calculated to be zero when the absolute value of the steering angular speed $d\theta$ is a minute value and to become larger in the range of larger than zero as the absolute value of the steering angular speed $d\theta$ is larger. However, when the magnitude of the correction amount $\Delta T2$ exceeds the magnitude of the target inertia compensation assist torque Tai, the magnitude of the correction amount $\Delta T2$ is limited to the magnitude of the target inertia compensation assist torque Tai.

When step 180 or step 270 is completed, control proceeds to step 300. In step 300, the target steering assist torque Tat is calculated according to a following expression (3). In the expression (3), signTab is a sign of the target basic steering assist torque Tab. A value Tai−$\Delta T2$*signTab obtained by subtracting a product $\Delta T2$*signTab from the target inertia compensation steering assist torque Tai is a corrected target inertia compensation steering assist torque with its magnitude being reduced with the magnitude of the correction amount $\Delta T2$.

$$Tat = Tab + Tai - \Delta T2 * signTab \quad (3)$$

According to the second embodiment, when it is determined in step 90 that the steering operation of the driver is turn-back with acceleration and deceleration, the magnitude of the correction amount $\Delta T2$ is calculated based on the absolute value of the steering angular speed $d\theta$ in step 200. In step 300, the target steering assist torque Tat is calculated as a sum of the target basic steering assist torque Tab and the value Tai−$\Delta T2$*signTab obtained by subtracting the product $\Delta T2$*signTab from the target inertia compensation steering assist torque Tai. Furthermore, in steps 310 and 410, the electric power steering device 22 is controlled so that the steering assist torque Ta coincides with the target steering assist torque Tat.

Therefore, according to the second embodiment, as in the first embodiment, in the situation where turn-back is performed with acceleration and deceleration, decreasing the magnitude of the target inertia compensation assist torque makes it possible to decrease the magnitude of the current component corresponding to the target inertia compensation assist torque. Therefore, it becomes possible to decrease the magnitude of the inertia compensation assist torque that acts as inertia torque at the time of turn-back with acceleration and deceleration.

Figure 4:
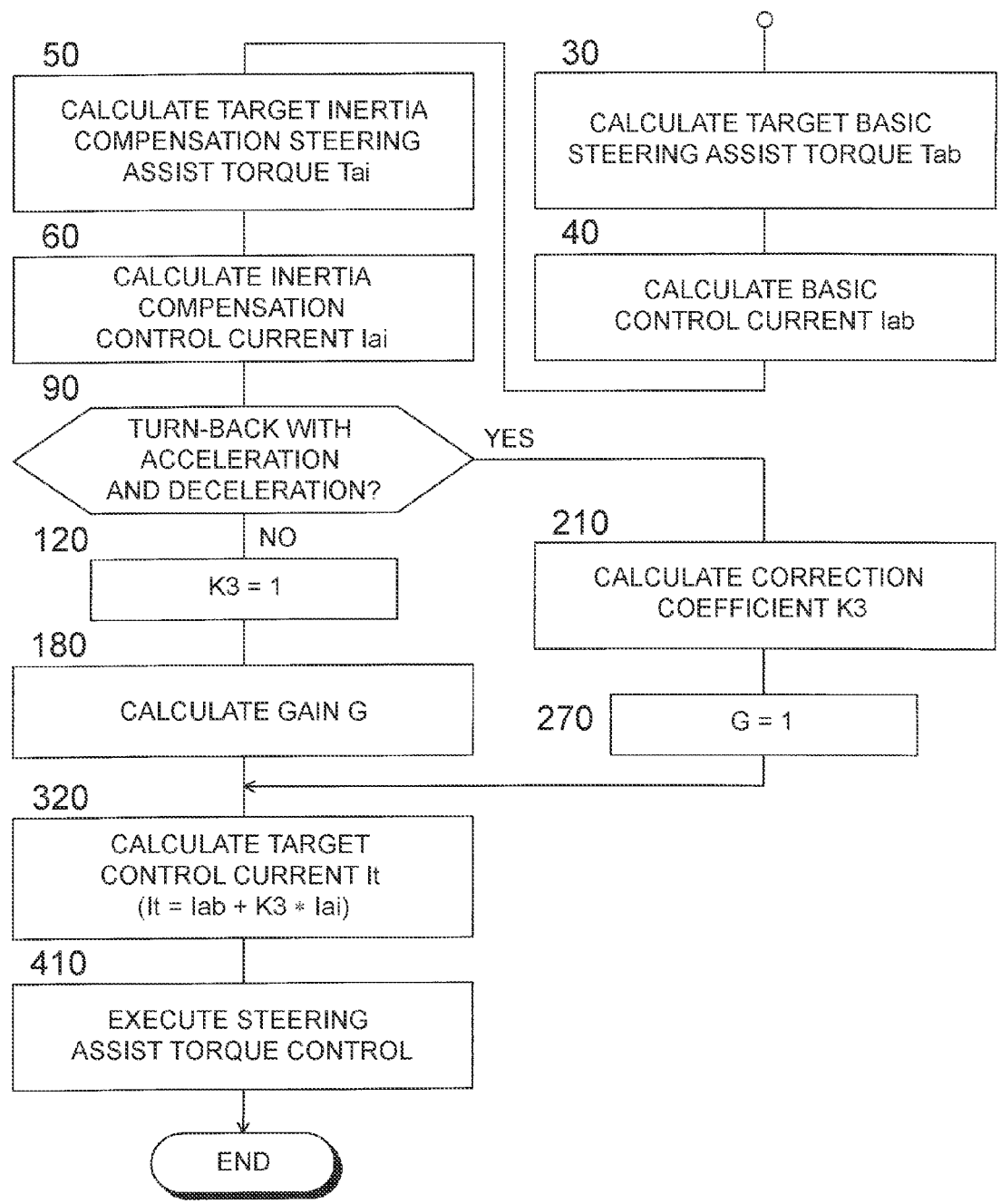
FIG. 4 is a flowchart illustrating the steering assist torque control routine in a third embodiment with part of the routine being omitted.

A description is given of the third embodiment. FIG. 4 is a flowchart illustrating the steering assist torque control routine in the third embodiment.

As is clear from comparison between FIG. 4 and FIG. 2, in the third embodiment, steps 10 to 30, 50, 90, 180, 270, 410 are executed in the same manner as in the first embodiment. When step 30 is completed, control proceeds to step 40. When step 50 is completed, control proceeds to step 60. When step 60 is completed, control proceeds to step 90.

In step 40, a basic steering assist torque control current Iab is calculated for making the basic steering assist torque coincide with the target basic steering assist torque Tab based on the target basic steering assist torque Tab.

In step 60, an inertia compensation control current Iai is calculated for making the inertia compensation assist torque coincide with the target inertia compensation assist torque Tai based on the target inertia compensation assist torque Tai.

Figure 15:
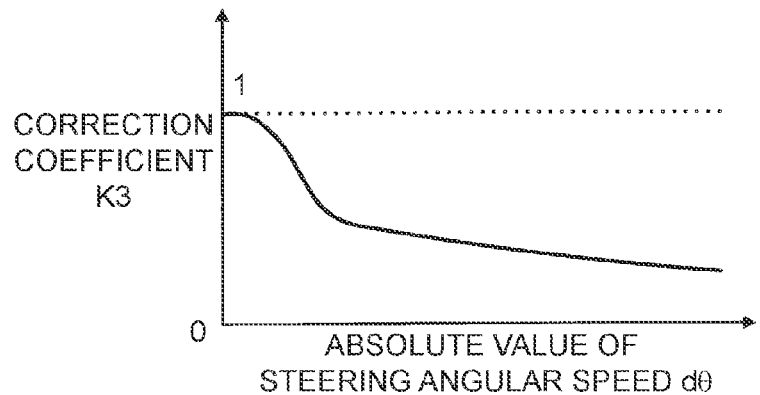
FIG. 15 is a map used to calculate a correction coefficient K3 for reducing the magnitude of an inertia compensation control current Iai based on the absolute value of the steering angular speed $d\theta$ in the third embodiment.

When the result of determination is negative in step 90, a correction coefficient K3 for reducing the magnitude of the inertia compensation control current Iai is set to one in step 120. On the contrary, when the result of determination is positive in step 90, the correction coefficient K3 is calculated from the map illustrated in FIG. 15 based on the absolute value of the steering angular speed $d\theta$ in step 210. As with the case of correction coefficient K1, the correction coefficient K3 is calculated to be one when the absolute value of the steering angular speed dθ is a minute value and to become smaller in the range of less than one as the absolute value of the steering angular speed dθ is larger.

When step 180 or step 270 is completed, control proceeds to step 320. When step 320 is completed, control proceeds to step 410. In step 320, the target control current It is calculated for controlling the electric power steering device 22 according to a following expression (4). A product K2*Iai in the expression (4) is a corrected target inertia correction control current with its magnitude being reduced with the correction coefficient K3.

$$It=Iab+K3*Iai \qquad (4)$$

According to the third embodiment, in step 40, the basic steering assist torque control current Iab is calculated based on the target basic steering assist torque Tab, and in step 60, the inertia compensation control current Iai is calculated based on the target inertia compensation assist torque Tai.

When it is determined in step 90 that the steering operation of the driver is turn-back with acceleration and deceleration, the correction coefficient K3 is calculated based on the absolute value of the steering angular speed dθ in step 210, the correction coefficient K3 becoming smaller in the range of less than one and larger than zero as the absolute value of the steering angular speed dθ is larger.

In step 320, the target control current It is calculated as a sum of the basic steering assist torque control current Iab and the inertia compensation control current Iai with its magnitude being corrected to be smaller with the correction coefficient K3. Furthermore, in step 410, the control current supplied to the electric power steering device 22 is controlled to coincide with the target control current It.

Therefore, according to the third embodiment, the magnitude of the inertia compensation control current Iai is corrected to be smaller with the correction coefficient K3. As a consequence, in the situation where turn-back with acceleration and deceleration is performed, the magnitude of the current component corresponding to the target inertia compensation assist torque can be decreased. Therefore, it becomes possible to decrease the magnitude of the inertia compensation assist torque that acts as inertia torque at the time of turn-back with acceleration and deceleration.

Figure 5:
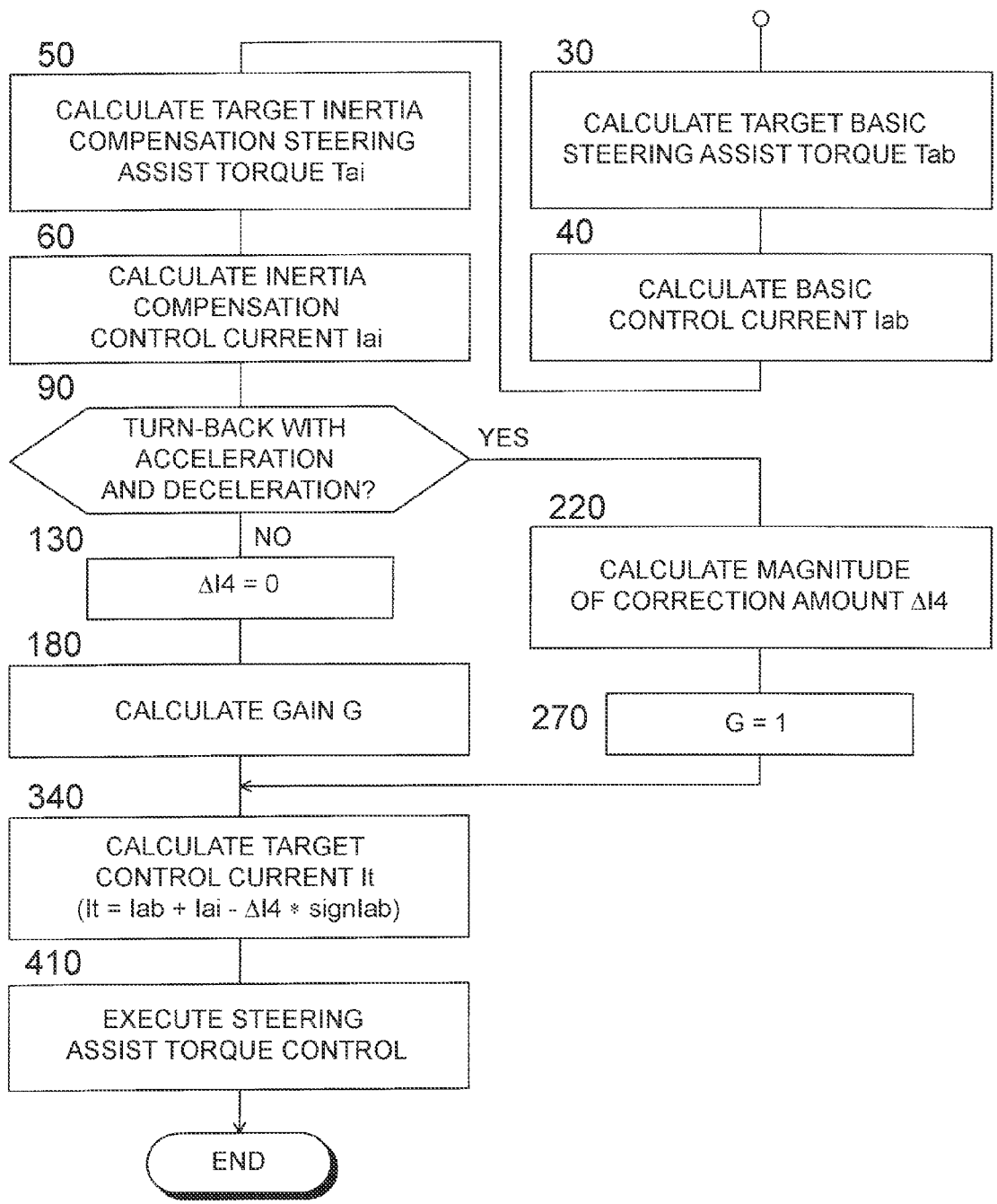
FIG. 5 is a flowchart illustrating the steering assist torque control routine in a fourth embodiment with part of the routine being omitted.

A description is given of the fourth embodiment. FIG. 5 is a flowchart illustrating the steering assist torque control routine in the fourth embodiment.

As is clear from comparison between FIG. 5 and FIG. 4, in the fourth embodiment, steps 10 to 90, 180, 270, 410 are executed in the same manner as in the third embodiment.

Figure 16:
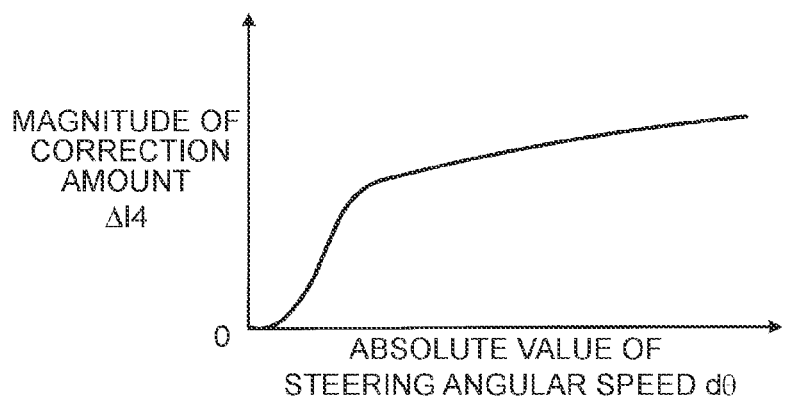
FIG. 16 is a map used to calculate the magnitude of a correction amount $\Delta I4$ for reducing the magnitude of the inertia compensation control current Iai based on the absolute value of the steering angular speed $d\theta$ in the fourth embodiment.

When the result of determination is negative in step 90, the magnitude of a correction amount ΔI4 for reducing the magnitude of the inertia compensation control current Iai is set to zero in step 130. On the contrary, when the result of determination is positive in step 90, the magnitude of the correction amount ΔI4 is calculated from the map illustrated in FIG. 16 based on the absolute value of the steering angular speed dθ in step 220.

The magnitude of the correction amount ΔI4 is calculated to be zero when the absolute value of the steering angular speed dθ is a minute value and to become larger in the range of larger than zero as the absolute value of the steering angular speed dθ is larger. However, when the magnitude of the correction amount ΔI4 exceeds the magnitude of the inertia compensation control current Iai, the magnitude of the correction amount ΔI4 is limited to the magnitude of the inertia compensation control current Iai.

When step 180 or step 270 is completed, control proceeds to step 340. In step 340, the target control current It is calculated for controlling the electric power steering device 22 according to a following expression (5). In the expression (5), signIab is a sign of the basic steering assist torque control current Iab. A value Iai−ΔI4*signIab obtained by subtracting a product ΔI4*signIab from the inertia compensation control current Iai is a corrected inertia compensation control current with its magnitude being reduced with the magnitude of the correction amount ΔI4.

$$It=Iab+Iai-\Delta I4*signIab \qquad (5)$$

According to the fourth embodiment, when it is determined in step 90 that the steering operation of the driver is turn-back with acceleration and deceleration, the magnitude of the correction amount ΔI4 is calculated based on the absolute value of the steering angular speed dθ in step 220. In step 340, the basic steering assist torque Tat is calculated as a sum of the target basic steering assist torque control current Iab and a value Iai−ΔI4*signIab obtained by subtracting the product ΔI4*signIab from the inertia compensation control current Iai. Furthermore, in step 410, the electric power steering device 22 is controlled so that the steering assist torque Ta coincides with the target steering assist torque Tat.

Therefore, according to the fourth embodiment, as in the case of the third embodiment, in the situation where turn-back with acceleration and deceleration is performed, the magnitude of the current component corresponding to the target inertia assist torque can be decreased. Therefore, it becomes possible to decrease the magnitude of the inertia compensation assist torque that acts as inertia torque at the time of turn-back with acceleration and deceleration.

According to the first to fourth embodiments, it becomes possible to decrease the magnitude of the inertia compensation control current Iai which is a current component corresponding to the inertia compensation control current Iai, without decreasing the magnitude of the basic steering assist torque control current Iab. Therefore, it becomes possible to avoid the situation where the magnitude of the steering assist torque corresponding to the target basic steering assist torque Tab decreases.

Figure 6:
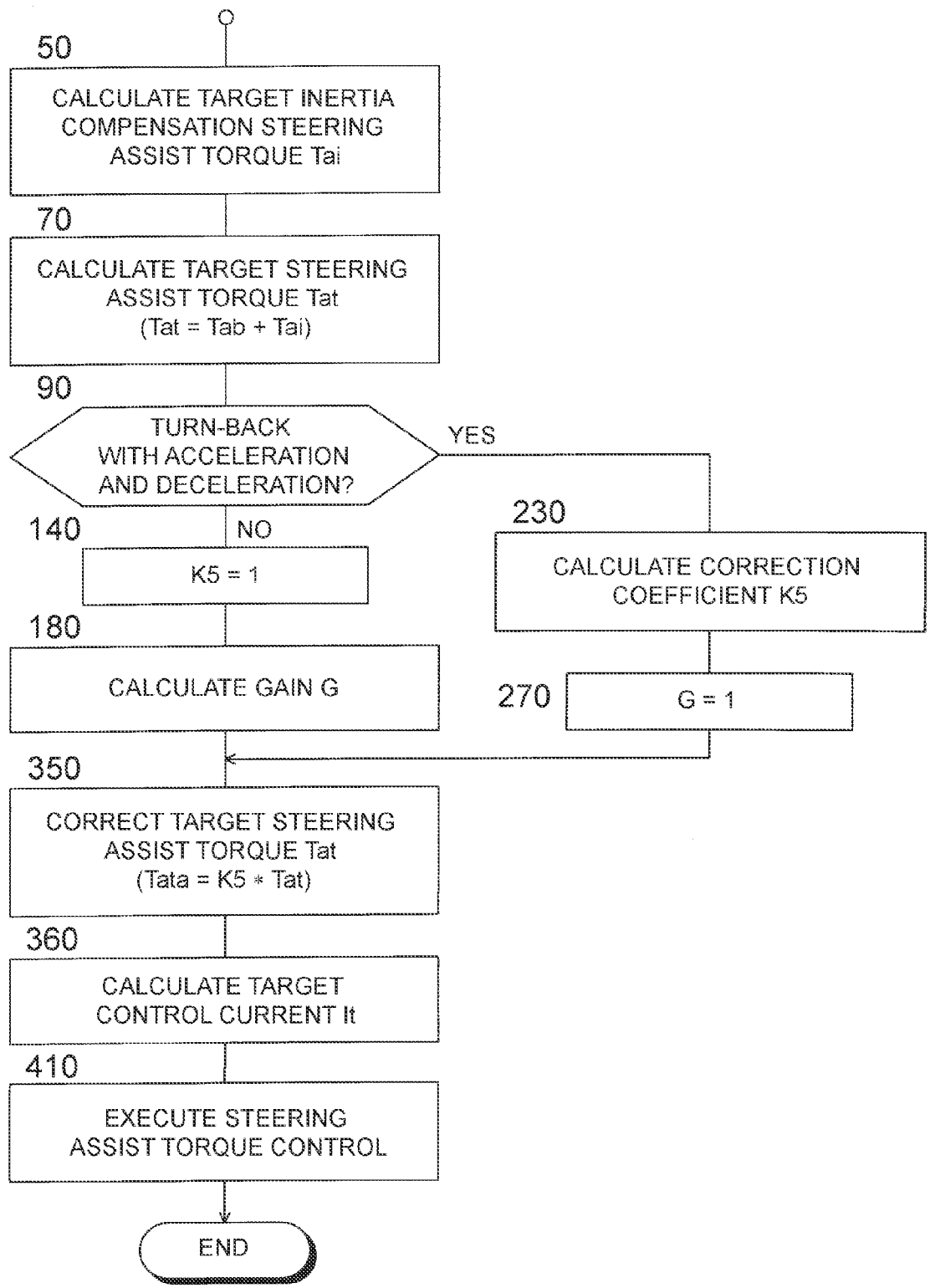
FIG. 6 is a flowchart illustrating the steering assist torque control routine in a fifth embodiment with part of the routine being omitted.

A description is given of the fifth embodiment. FIG. 6 is a flowchart illustrating the steering assist torque control routine in the fifth embodiment.

Although steps 10 to 40 are not illustrated in FIG. 6, steps 10 to 50 are executed in the same manner as in the case of the first embodiment. Steps 90, 180, 270, 410 are also executed in the same manner as in the case of the first embodiment. When step 50 is completed, control proceeds to step 70. In step 70, the target steering assist torque Tat is calculated as a sum of the target basic steering assist torque Tab and the target inertia compensation steering assist torque Tai according to a following expression (6).

$$Tat=Tab+Tai \qquad (6)$$

Figure 17:
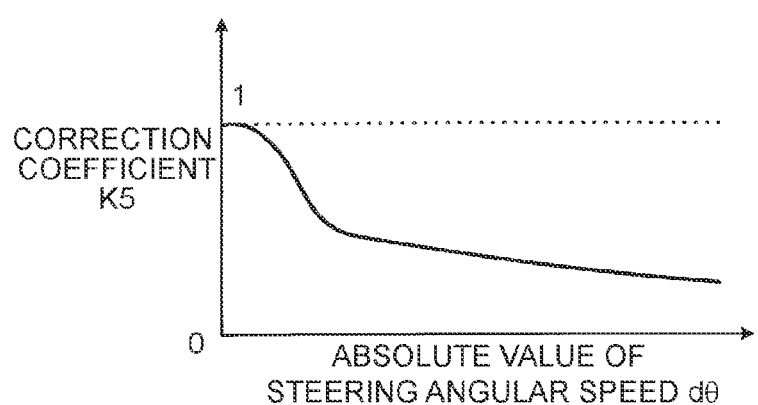
FIG. 17 is a map used to calculate a correction coefficient K5 for reducing a target steering assist torque Tat based on the absolute value of the steering angular speed $d\theta$ in the fifth embodiment.

When the result of determination is negative in step 90, a correction coefficient K5 for reducing the magnitude of the target steering assist torque Tat including the target inertia compensation steering assist torque Tai is set to one in step 140. On the contrary, when the result of determination is positive in step 90, the correction coefficient K5 is calculated from the map illustrated in FIG. 17 based on the absolute value of the steering angular speed dθ in step 230. As with the case of the correction coefficient K1 and the like, the correction coefficient K5 is calculated to be one when the absolute value of the steering angular speed dθ is a minute value and to become smaller in the range of less than one as the absolute value of the steering angular speed dθ is larger.

When step 180 or step 270 is completed, control proceeds to step 350. In step 350, a corrected target steering assist torque Tata is calculated according to a following expression (7). As is clear from the expression (7), the corrected target steering assist torque Tata is a value of the target steering assist torque Tat with its magnitude being reduced with the correction coefficient K5.

$$Tata = K5 * Tat \tag{7}$$

When step 350 is completed, control proceeds to step 360. In step 360, the target control current It to control the electric power steering device 22 for making the steering assist torque Ta coincide with the corrected target steering assist torque Tata is calculated based on the correct target steering assist torque Tata.

According to the fifth embodiment, in step 70, the target steering assist torque Tat is calculated as a sum of the target basic steering assist torque Tab and the target inertia compensation steering assist torque Tai. When it is determined in step 90 that the steering operation of the driver is turn-back with acceleration and deceleration, the correction coefficient K5 is calculated based on the absolute value of the steering angular speed dθ in step 230, the correction coefficient K5 becoming smaller in the range of less than one and larger than zero as the absolute value of the steering angular speed dθ is larger.

In step 350, a corrected target steering assist torque Tata is calculated by correcting the magnitude of the target steering assist torque Tat to be smaller with the correction coefficient K5. Furthermore, in steps 360 and 410, the electric power steering device 22 is controlled so that the steering assist torque Ta coincides with the corrected target steering assist torque Tata.

Therefore, according to the fifth embodiment, the magnitude of the target inertia compensation steering assist torque Tai is reduced to correct the magnitude of the target steering assist torque Tat to be smaller. Accordingly, in the situation where turn-back with acceleration and deceleration is performed, the magnitude of the current component corresponding to the target inertia compensation assist torque can be decreased. Therefore, it becomes possible to decrease the magnitude of the inertia compensation assist torque that acts as inertia torque at the time of turn-back with acceleration and deceleration.

Since self-aligning torque acts in the direction of promoting steering at the time of return steering, the steering torque T has a value of zero or a small negative value. Consequently, even when the magnitude of the target steering assist torque Tat including the basic target steering assist torque Tab based on the steering torque T is decreased, the driver does not feel excessive increase in a load of steering. Therefore, when the steering operation of the driver is the turn-back steering with acceleration and deceleration, no inconvenience is caused by decreasing the magnitude of the target steering assist torque Tab which causes decrease in the magnitude of the target inertia compensation assist torque Tai.

A description is given of the sixth embodiment. FIG. 7 is a flowchart illustrating the steering assist torque control routine in the sixth embodiment.

As is clear from comparison between FIG. 7 and FIG. 6, in the sixth embodiment, steps 10 to 70, 90, 180, 270, 410 are executed in the same manner as in the fifth embodiment. Step 380 is executed like step 360 in the fifth embodiment.

Figure 18:
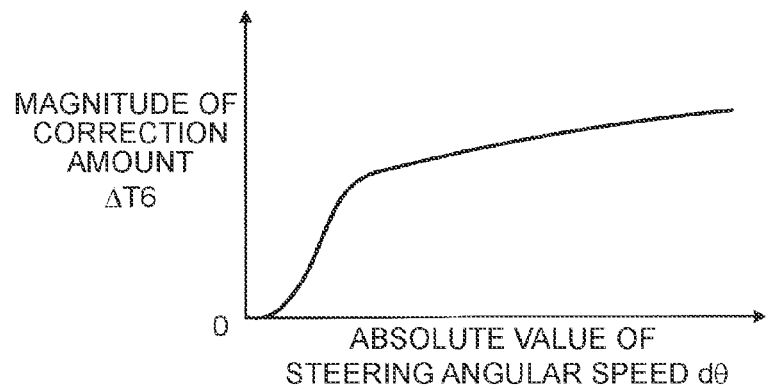
FIG. 18 is a map used to calculate the magnitude of a correction amount $\Delta T6$ for reducing the magnitude of the target steering assist torque Tat based on the absolute value of the steering angular speed $d\theta$ in the sixth embodiment.

When the result of determination is negative in step 90, in step 150, the magnitude of a correction amount ΔT6 for reducing the magnitude of the target steering assist torque Tat including the target inertia compensation steering assist torque Tai is set to zero. On the contrary, when the result of determination is positive in step 90, the magnitude of the correction amount ΔT6 is calculated from the map illustrated in FIG. 18 based on the absolute value of the steering angular speed dθ in step 240.

The magnitude of the correction amount ΔT6 is calculated to be zero when the absolute value of the steering angular speed dθ is a minute value and to become larger in the range of larger than zero as the absolute value of the steering angular speed dθ is larger. However, when the magnitude of the correction amount ΔT6 exceeds the magnitude of the target inertia compensation assist torque Tat, the magnitude of the correction amount ΔT6 is limited to the magnitude of the target steering assist torque Tat.

When step 180 or step 270 is completed, control proceeds to step 370. In step 370, a corrected target steering assist torque Tata is calculated according to a following expression (8). In the expression (8), signTat is a sign of the target steering assist torque Tat. A value Tat−ΔT6*signTat obtained by subtracting a product ΔT6*signTat from the target steering assist torque Tat is a corrected target steering assist torque with its magnitude being reduced with the magnitude of the correction amount ΔT6.

$$Tata = Tat - \Delta T6 * signTat \tag{8}$$

According to the sixth embodiment, when it is determined in step 90 that the steering operation of the driver is turn-back with acceleration and deceleration, the magnitude of the correction amount ΔT6 is calculated based on the absolute value of the steering angular speed dθ in step 240. In step 370, a corrected target steering assist torque Tata is calculated by subtracting the product ΔT6*signTat from the target steering assist torque Tat. Furthermore, in steps 360 and 410, the electric power steering device 22 is controlled so that the steering assist torque Ta coincides with the corrected target steering assist torque Tata.

Therefore, according to the sixth embodiment, as in the case of the fifth embodiment, in the situation where turn-back with acceleration and deceleration is performed, the magnitude of the current component corresponding to the target inertia assist torque can be decreased. Therefore, it becomes possible to decrease the magnitude of the inertia compensation assist torque that acts as inertia torque at the time of turn-back with acceleration and deceleration.

Figure 8:
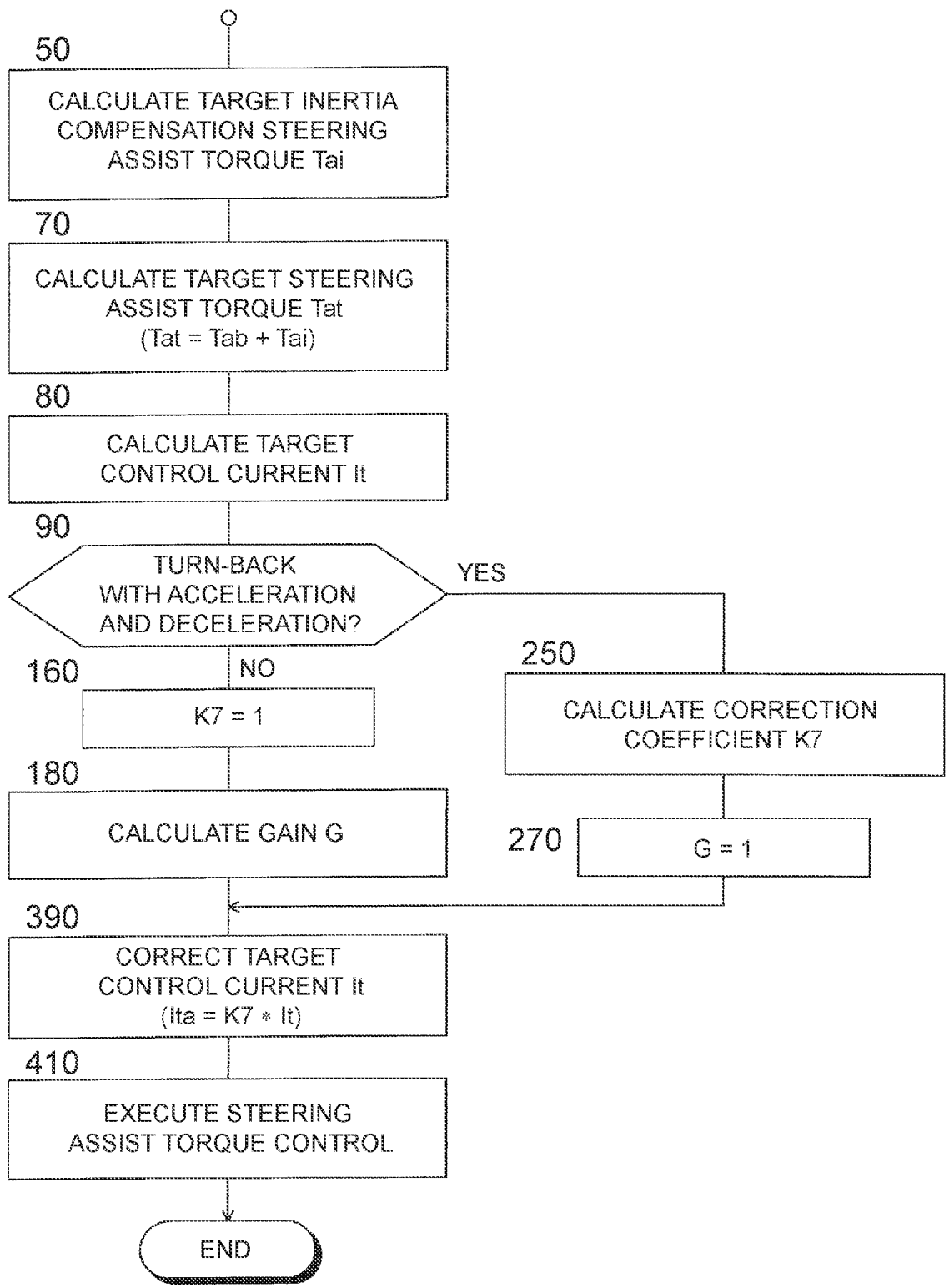
FIG. 8 is a flowchart illustrating the steering assist torque control routine in a seventh embodiment with part of the routine being omitted.

A description is given of the seventh embodiment. FIG. 8 is a flowchart illustrating the steering assist torque control routine in the seventh embodiment.

Although steps 10 to 40 are not illustrated in FIG. 6, steps 10 to 70 are executed in the same manner as in the case of the fifth embodiment. Steps 90, 180, 270, 410 are also executed in the same manner as in the case of the fifth embodiment. When step 70 is completed, control proceeds to step 80. In step 80, as in step 290 of the first embodiment, the target control current It to control the electric power steering device 22 for making the steering assist torque Ta coincide with the target steering assist torque Tat is calculated based on the target steering assist torque Tat.

Figure 19:
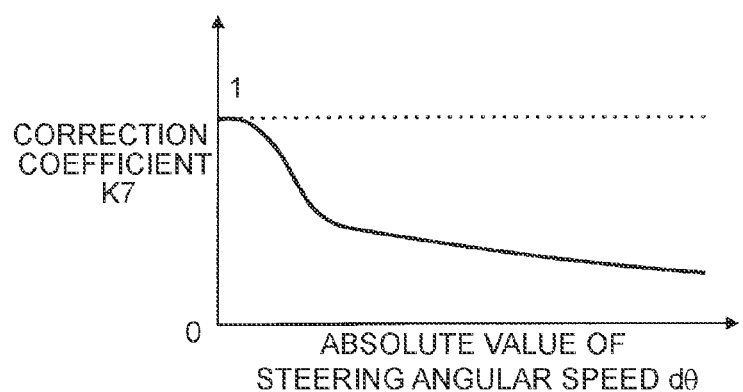
FIG. 19 is a map used to calculate a correction coefficient K7 for reducing the magnitude of a target control current It based on the absolute value of the steering angular speed $d\theta$ in the seventh embodiment.

When the result of determination is negative in step 90, a correction coefficient K7 for reducing the magnitude of the target control current It including the control current component corresponding to the target inertia compensation steering assist torque Tai is set to one in step 160. On the contrary, when the result of determination is positive in step 90, the correction coefficient K7 is calculated from the map illustrated in FIG. 19 based on the absolute value of the steering angular speed dθ in step 250. As with the case of the correction coefficient K1 and the like, the correction coefficient K7 is calculated to be one when the absolute value of the steering angular speed dθ is a minute value and to become smaller in the range of less than one as the absolute value of the steering angular speed dθ is larger.

When step 180 or step 270 is completed, control proceeds to step 390. In step 390, a corrected target control current Ita is calculated according to a following expression (9). As is clear from the expression (9), the corrected target control current Ita is a value obtained by reducing the magnitude of the target control current It with the correction coefficient K7.

$$Ita = K7*It \qquad (9)$$

According to the seventh embodiment, when it is determined in step 90 that the steering operation of the driver is turn-back with acceleration and deceleration, the correction coefficient K7 is calculated based on the absolute value of the steering angular speed dθ in step 250, the correction coefficient K7 becoming smaller in the range of less than one and larger than zero as the absolute value of the steering angular speed dθ is larger.

In step 390, a corrected target control current Ita is calculated by reducing the magnitude of the target control current It to be smaller with the correction coefficient K7. Furthermore, in step 410, the control current supplied to the electric power steering device 22 is controlled to coincide with the corrected target control current Ita.

Therefore, according to the seventh embodiment, the magnitude of the target control current It is reduced to correct the magnitude of the inertia compensation control current Iai to be smaller. Accordingly, in the situation where turn-back with acceleration and deceleration is performed, the magnitude of the current component corresponding to the target inertia compensation assist torque can be decreased. Therefore, it becomes possible to decrease the magnitude of the inertia compensation assist torque that acts as inertia torque at the time of turn-back with acceleration and deceleration.

Figure 9:
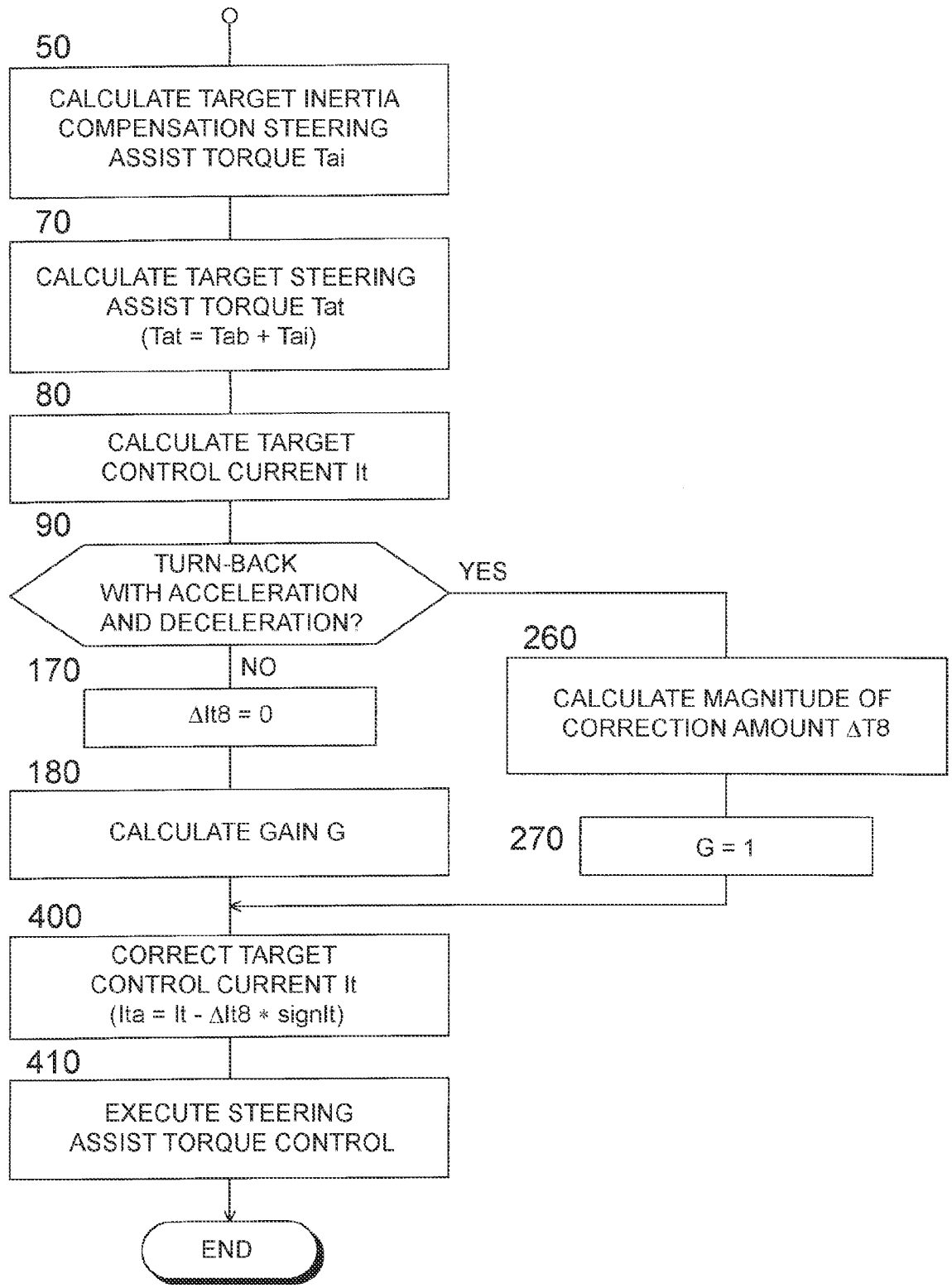
FIG. 9 is a flowchart illustrating the steering assist torque control routine in an eighth embodiment with part of the routine being omitted.

A description is given of the eighth embodiment. FIG. 9 is a flowchart illustrating the steering assist torque control routine in the eighth embodiment.

As is clear from comparison between FIG. 9 and FIG. 8, in the eighth embodiment, steps 10 to 90, 180, 270, 410 are executed in the same manner as in the seventh embodiment.

Figure 20:
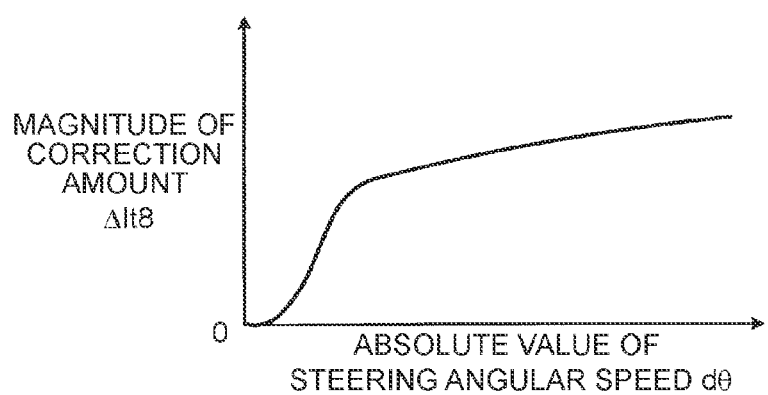
FIG. 20 is a map used to calculate the magnitude of a correction amount $\Delta It8$ for reducing the magnitude of the target control current It based on the absolute value of the steering angular speed $d\theta$ in the eighth embodiment.

When the result of determination is negative in step 90, the magnitude of a correction amount ΔIt8 for reducing the magnitude of the target control current It including the control current component corresponding to the target inertia compensation steering assist torque Tai is set to zero in step 170. On the contrary, when the result of determination is positive in step 90, the magnitude of the correction amount ΔIt8 is calculated from the map illustrated in FIG. 20 based on the absolute value of the steering angular speed dθ in step 260.

When step 180 or step 270 is completed, control proceeds to step 400. In step 400, a corrected target control current Ita is calculated according to a following expression (10). In the expression (10), signIt is a sign of the target control current It. The corrected target control current Ita is a corrected target control current with its magnitude being reduced with the magnitude of the correction amount ΔIt8.

$$Ita = It - \Delta It8*signIt \qquad (10)$$

According to the eighth embodiment, when it is determined in step 90 that the steering operation of the driver is turn-back with acceleration and deceleration, the magnitude of the correction amount ΔIt8 is calculated based on the absolute value of the steering angular speed dθ in step 260. In step 400, the corrected target control current Ita is calculated as the value It−ΔIt8*signIt obtained by subtracting the product ΔIt8*signIt from the target control current It. Furthermore, in step 410, the control current supplied to the electric power steering device 22 is controlled to coincide with the corrected target control current Ita.

Therefore, according to the eighth embodiment, as in the case of the seventh embodiment, the magnitude of the target control current It is reduced so that the magnitude of the inertia compensation control current Iai is corrected to be smaller. Accordingly, in the situation where turn-back with acceleration and deceleration is performed, the magnitude of the current component corresponding to the target inertia compensation assist torque can be decreased. Therefore, it becomes possible to decrease the magnitude of the inertia compensation assist torque that acts as inertia torque at the time of turn-back with acceleration and deceleration.

According to the first to eighth embodiments, as the absolute value of the steering angular speed dθ is larger, the reduction amount of the magnitude of the target inertia compensation steering assist torque Tai and the like, is larger. Therefore, it becomes possible to decrease the magnitude of the inertia compensation steering assist torque that acts as inertia torque.

According to the first to eighth embodiment, when it is determined in step 90 that the steering operation of the driver is not the turn-back steering with acceleration and deceleration, then step 180 is executed. That is, the gain G for control current feedback control is calculated based on the absolute value of the product I*dθ*ddθ of the moment of inertia I of the steering wheel 16, the steering angular speed dθ, and the steering angular acceleration ddb. The gain G is calculated to become larger in the range of larger than one as the absolute value of the product I*dθ*ddθ is larger. Furthermore, in step 180, feedback control is performed using the gain G so that the control current supplied to the electric power steering device 22 coincides with the target control current It or the corrected target control current Ita.

Therefore, as the absolute value of the product I*dθ*ddθ is larger and the steering of the driver is rougher, the control current can be controlled to coincide with the target control current It or the corrected target control current Ita more effectively. Therefore, it becomes possible to prevent responsiveness in the control of steering assist torque from becoming excessive in the situation where the absolute value of the product I*dθ*ddθ is small and the steering operation of the driver is mild. In the situation where the absolute value of the product I*dθ*ddθ is large and the steering operation of the driver is rough, the control current of the electric power steering device can be controlled to coincide with the target control current with sufficient responsiveness. Therefore, the possibilities of the driver feeling insufficient smoothness in the turn-increase steering can be reduced, and the influence of disturbance on the steering feeling can be reduced, the disturbance being input from the road surface into the steering wheel.

Figure 12:
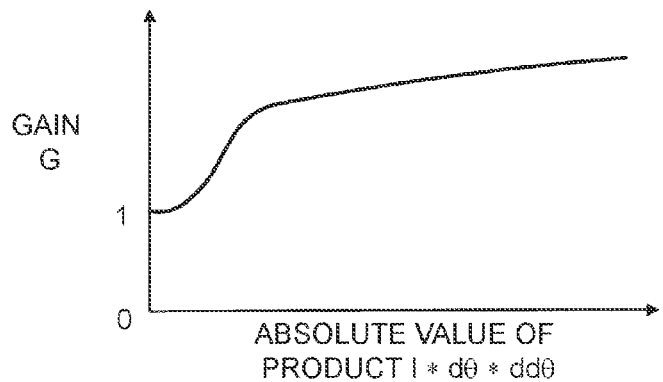
FIG. 12 is a map for calculation of a gain G for control current feedback control based on an absolute value of a product $I*d\theta*dd\theta$ of the moment of inertia I of the steering wheel, steering angular speed $d\theta$, and the steering angular acceleration $dd\theta$.

As illustrated in FIG. 12, when the absolute value of the product I*dθ*ddθ is zero, i.e., when at least one of the steering angular speed dθ and the steering angular acceleration ddθ is zero, the gain G is calculated to be one and not to be larger than one. Therefore, steps 90 and 180 function to determine whether or not the steering operation of the driver is turn-increase steering with acceleration and deceleration and to increase the gain G to a value larger than one when it is determined that the steering operation of the driver is turn-increase steering with acceleration and deceleration.

In order to make an accurate determination regarding whether or not the steering operation of the driver is turn-increase steering with acceleration and deceleration, the routine may be modified so that determination regarding whether or not the steering operation of the driver is turn-increase steering with acceleration and deceleration is performed before step 180, and step 180 is executed when the result of determination is positive, while step 270 is executed when the result of determination is negative, for example.

In the first to eighth embodiments, when it is determined that the steering operation of the driver is not turn-back steering with acceleration and deceleration, then step 180 is executed when the result of determination is negative in step 90, while steps 190 to 260 are executed when the result of determination is positive in step 90. However, step 180 may be executed when the result of determination is negative in step 90 regardless of whether or not steps 190 to 260 are executed when the result of determination is positive in step 90.

In the first to eighth embodiments, at the time of turn-back with acceleration and deceleration, the magnitude of the current component corresponding to the inertia compensation assist torque is decreased. Accordingly, even with a large variation range is set for the gain G, it becomes possible to avoid the situation where the magnitude of the inertia torque is excessively increased due to the inertia compensation assist torque.

Although specific embodiments of the present disclosure have been described in detail in the foregoing, the present disclosure is not limited to the embodiments disclosed, and it is apparent to those skilled in the art that various other embodiments are possible without departing from the scope of the present disclosure.

For example, in each of the embodiments disclosed, the moment of inertia I used for calculation of the target inertia compensation steering assist torque Tai in step 50 is the moment of inertia of the steering wheel 16. However, the moment of inertia I may be modified to the moment of inertia of the steering wheel 16 and an arm of the driver. The moment of inertia I may further be modified to the moment of inertia of the steering wheel 16, a component member such as a steering shaft that rotates with the steering wheel 16, and the arm of the driver.

In each of the embodiments disclosed, the gain G for control current feedback control is calculated based on the absolute value of the product $I*d\theta*dd\theta$ of the moment of inertia I, the steering angular speed $d\theta$, and the steering angular acceleration $dd\theta$ in step 180. However, since the moment of inertia I is substantially a constant value, the gain G may be calculated based on the absolute value of a product $d\theta*dd\theta$ of the steering angular speed $d\theta$ and the steering angular acceleration $dd\theta$, so that variable setting of the gain G may be omitted.

In each of the embodiments disclosed, when it is determined in step 90 that the steering operation of the driver is not turn-back steering with acceleration and deceleration, then step 180 is executed. When it is determined in step 90 that the steering operation of the driver is turn-back steering with acceleration and deceleration, steps 190 to 260 are executed. However, regardless of whether or not steps 190 to 260 are executed when it is determined that the steering operation of the driver is the turn-back steering with acceleration and deceleration, the gain G for control current feedback control may be calculated as in step 180 when it is determined that the steering operation of the driver is turn-increase steering with acceleration and deceleration.

As described in the foregoing, the absolute value of the product $I*d\theta*dd\theta$ used for calculation of the gain G is an index value indicating the roughness of the steering operation of the driver. As the steering operation is rougher, the driver is more likely to feel change in steering feeling when the inertia compensation torque turns into resistance torque. Therefore, each of the embodiments disclosed may be modified so that the magnitude of the current component corresponding to the target inertia compensation assist torque Tai becomes smaller as the absolute value of the product $I*d\theta*dd\theta$ is larger. That is, the magnitude of the parameters, such as the target inertia compensation assist torque Tai, may be modified to be decreased based on the absolute value of the product $I*d\theta*dd\theta$ as in the case of correction performed with the correction coefficients K1, K3, K5, K7 and the magnitudes of the correction amounts ΔT2, ΔI4, ΔT6, ΔIt8.

In each of the embodiments disclosed, the target steering assist torque Tat is calculated as a value including the target basic steering assist torque Tab and the target inertia compensation steering assist torque Tai. However, the target steering assist torque Tat may be calculated as a value including not only the target basic steering assist torque Tab and the target inertia compensation steering assist torque Tai, but also at least one of steering attenuation control assist torque, steering friction control assist torque, and return torque for returning the steering wheel 16 to the neutral position.

What is claimed is:

1. A steering assist device, comprising:
   a steering torque detector configured to detect steering torque;
   a steering operation amount acquisition device configured to acquire information on steering angular speed and steering angular acceleration;
   an electric power steering device configured to generate steering assist torque corresponding to a control current; and
   a control device, including a central processing unit which is configured to calculate, configured
   i) to calculate a target control current of the electric power steering device based on a target steering assist torque, and
   ii) to supply the control current corresponding to the target control current to the electric power steering device, the target steering assist torque including a basic target steering assist torque based on the steering torque and a target inertia compensation assist torque based on a product of a moment of inertia of a steering wheel and the steering angular acceleration, wherein the control device is configured
   iii) to determine a situation of steering operation of a driver based on the steering angular speed and the steering angular acceleration, and
   iv) to make, when it is determined that the steering operation is turn-back steering with acceleration and deceleration, the magnitude of a current component corresponding to the target inertia compensation assist torque in the target control current smaller as compared with when it is determined that the steering operation is turn-back steering with acceleration and deceleration than when it is determined that the steering operation of the driver is not the turn-back steering with acceleration and deceleration.

2. The steering assist device according to claim 1, wherein the control device is configured to make the magnitude of the current component corresponding to the target inertia compensation assist torque smaller as a magnitude of the steering angular speed is larger.

3. The steering assist device according to claim 1, wherein the control device is configured
to correct, when it is determined that the steering operation is the turn-back steering with acceleration and deceleration, the target inertia compensation assist torque so that the magnitude of the target inertia compensation assist torque becomes smaller when it is determined that the steering operation is the turn-back steering with acceleration and deceleration than as compared with when it is determined that the steering operation is not the turn-back steering with acceleration and deceleration, and
to calculate the target control current based on the target steering assist torque including the basic target steering assist torque and a corrected target inertia compensation assist torque.

4. The steering assist device according to claim 3, wherein the control device is configured to correct the target inertia compensation assist torque so that the magnitude of the target inertia compensation assist torque becomes smaller as the magnitude of the steering angular speed is larger.

5. The steering assist device according to claim 1, wherein the control device is configured to calculate the target control current as a value containing a first target control current based on the basic target steering assist torque and a second target control current based on the target inertia compensation assist torque when it is determined that the steering operation is not the turn-back steering with acceleration and deceleration, and
the control device is configured to calculate the target control current after correcting the second target control current so that the magnitude of the second target control current becomes smaller and to calculate the target control current as a value containing the first target control current and a corrected target control current when it is determined that the steering operation of the driver is the turn-back steering with acceleration and deceleration than when it is determined that the steering operation is not the turn-back steering with acceleration and deceleration.

6. The steering assist device according to claim 5, wherein the control device is configured to correct the second target control current so that the magnitude of the second target control current becomes smaller as the magnitude of the steering angular speed is larger.

7. The steering assist device according to claim 1, wherein the control device is configured
to correct the target steering assist torque so that the magnitude of the target steering assist torque becomes smaller when it is determined that the steering operation is the turn-back steering with acceleration and deceleration than when it is determined that the steering operation is not the turn-back steering with acceleration and deceleration, and
to calculate the target control current based on the corrected target steering assist torque corrected, when it is determined that the steering operation is the turn-back steering with acceleration and deceleration.

8. The steering assist device according to claim 7, wherein the control device is configured to correct the target steering assist torque so that the magnitude of the target steering assist torque becomes smaller as the magnitude of the steering angular speed is larger.

9. The steering assist device according to claim 1, wherein the control device is configured
to correct the target control current so that the magnitude of the target control current becomes smaller when it is determined that the steering operation is the turn-back steering with acceleration and deceleration than when it is not determined that the steering operation is the turn-back steering with acceleration and deceleration and to supply the control current corresponding to the target control current corrected to the electric power steering device.

10. The steering assist device according to claim 9, wherein
the control device is configured to correct the target control current so that the magnitude of the target control current becomes smaller as the magnitude of the steering angular speed is larger.

11. The steering assist device according to claim 1, wherein
the control device is configured to make a gain for feedback control smaller as an absolute value of the product of the steering angular speed and the steering angular acceleration is larger so that the control current of the electric power steering device coincides with the target control current, when it is determined that the steering operation is the a turn-increase steering with acceleration and deceleration.

* * * * *